United States Patent
Meyer et al.

(10) Patent No.: US 6,993,507 B2
(45) Date of Patent: Jan. 31, 2006

(54) BAR CODED BILL PAYMENT SYSTEM AND METHOD

(75) Inventors: John Meyer, Orange, CA (US); Lou Krouse, Rancho Palos Verdes, CA (US)

(73) Assignee: Pacific Payment Systems, Inc., Rancho Palos Verdes, CA (US)

( * ) Notice: Subject to any disclaimer, the term of this patent is extended or adjusted under 35 U.S.C. 154(b) by 2 days.

(21) Appl. No.: 09/737,011

(22) Filed: Dec. 14, 2000

(65) Prior Publication Data

US 2002/0077976 A1   Jun. 20, 2002

(51) Int. Cl.
*G06F 17/60* (2006.01)

(52) U.S. Cl. .......................... 705/40; 705/39; 705/34; 705/35; 235/380; 235/375; 235/462.1

(58) Field of Classification Search ............. 235/462.1, 235/380, 375; 705/35, 39, 40
See application file for complete search history.

(56) References Cited

U.S. PATENT DOCUMENTS

| | | | | |
|---|---|---|---|---|
| 5,053,607 A | * | 10/1991 | Carlson et al. | 705/18 |
| 5,121,945 A | | 6/1992 | Thomson et al. | 283/58 |
| 5,317,135 A | * | 5/1994 | Finocchio | 463/17 |
| 5,324,922 A | | 6/1994 | Roberts | 235/375 |
| 5,326,959 A | | 7/1994 | Perazza | 235/379 |
| 5,465,206 A | | 11/1995 | Hilt et al. | 364/406 |
| 5,596,501 A | * | 1/1997 | Comer et al. | 364/464.23 |
| 5,616,902 A | | 4/1997 | Cooley et al. | 235/380 |
| 5,930,767 A | | 7/1999 | Reber et al. | 705/26 |
| 6,032,195 A | | 2/2000 | Reber et al. | 709/245 |
| 6,070,150 A | * | 5/2000 | Remington et al. | 705/34 |
| 6,070,798 A | | 6/2000 | Nethery | 235/462.01 |
| 6,097,834 A | | 8/2000 | Krouse et al. | 382/137 |
| 6,289,322 B1 | * | 9/2001 | Kitchen et al. | 705/40 |
| 6,317,745 B1 | * | 11/2001 | Thomas et al. | 707/100 |
| 6,334,116 B1 | * | 12/2001 | Ganesan et al. | 705/34 |
| 6,438,527 B1 | * | 8/2002 | Powar | 705/40 |
| 2002/0023055 A1 | * | 2/2002 | Antognini et al. | 705/40 |
| 2002/0049671 A1 | * | 4/2002 | Trende et al. | 705/40 |
| 2003/0023553 A1 | * | 1/2003 | Applewhite | 705/40 |

* cited by examiner

FOREIGN PATENT DOCUMENTS

DE         19701697      * 7/1998

*Primary Examiner*—Jagdish N Patel
(74) *Attorney, Agent, or Firm*—Hayes Soloway P.C.

(57) ABSTRACT

A bill payment system consistent with the invention comprises a biller generating at least one invoice for at least one customer, the invoice comprising a unique bar code comprising data identifying at least the customer and the biller, and a scanning apparatus configured to scan the bar code and, based on the identifying data of the bar code, to effect payment to the biller in a predetermined amount. In method form, a bill payment method consistent with the invention comprises: generating an invoice for at least one customer, said invoice comprising a unique bar code, said bar code comprising data identifying at least said customer and said biller; and permitting a third party to scan said bar code and, based on the identifying data of said bar code, to effect payment to said biller in a predetermined amount. In another embodiment, a bill payment network consistent with the invention comprises a plurality of billers, each biller generating an invoice for at least one customer, the invoice comprising a unique bar code comprising data identifying at least the customer and the biller, and a plurality of third parties in communication with the billers, each third party capable of scanning the bar code and, based on the identifying data of the bar code, effecting payment to the biller in a predetermined amount.

86 Claims, 14 Drawing Sheets

FIGURE 1 – PRIOR ART
FIGURE 2 – PRIOR ART
FIGURE 3 – PRIOR ART

FIGURE 4 – PRIOR ART
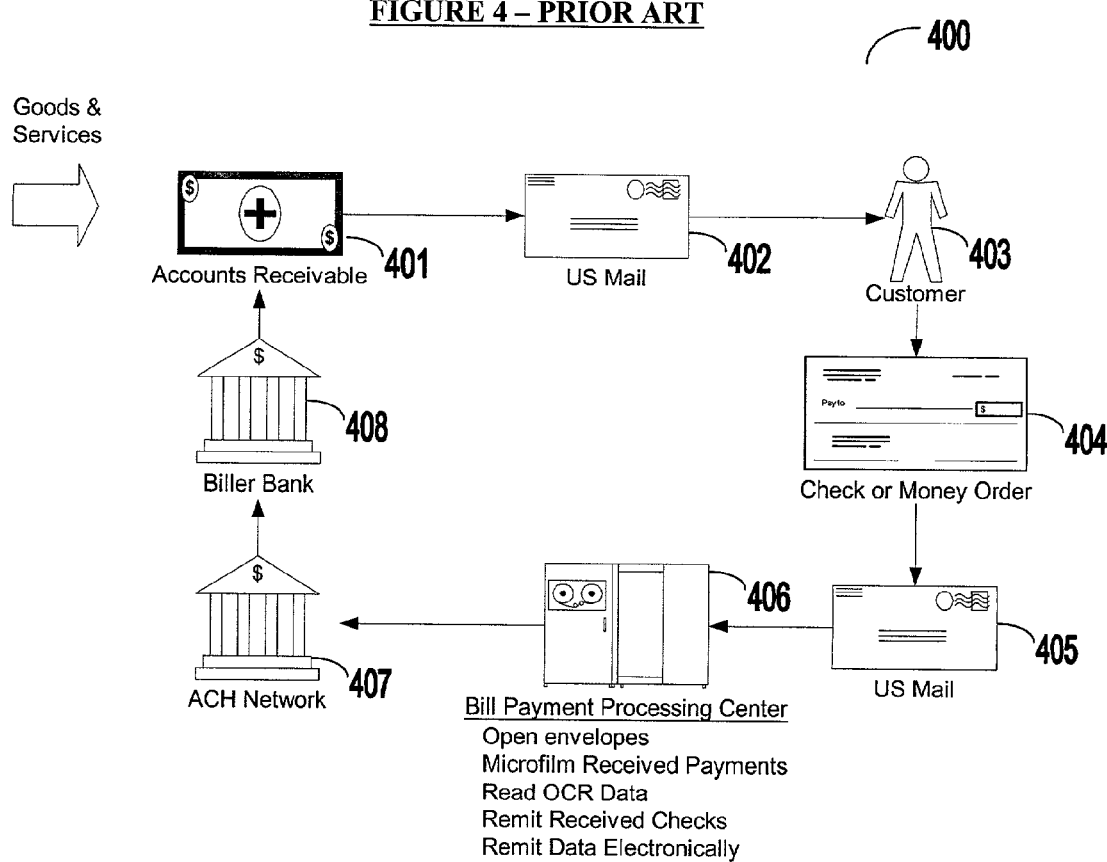
FIGURE 5
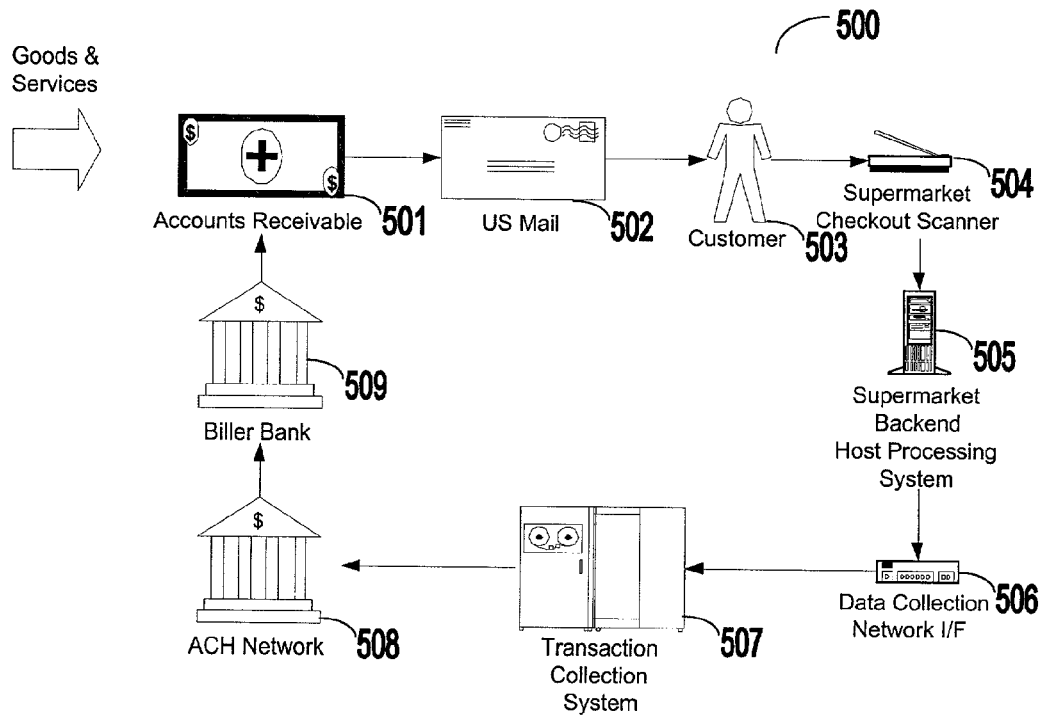

```
                                                                    ┌─600
L1    Bar Code Symbology with Embedded Check Symbol ← 601
L2      (fd) (......data.................................................) (cd) ← 602
L3         (fd) (......data............) (......data..............................) (cd)← 603
L4            (fd) (...data....) (cd)  (fd) (......data....) (......data....) (cd)← 604
:
Ln ← 605
```

```
                                                                    ┌─700
L1    Bar Code Symbology with Embedded Check Symbol
L2      (......data.................................................) (fd) (cd)
L3         (......data............) (......data..............................) (fd) (cd)
L4            (...data....) (fd) (cd)  (......data....) (......data....) (fd)  (cd)

Ln
```

LEVEL 1 ENVELOPE  ┌─800

LEVEL 2 ENVELOPE 130001735076405841036 3

| Digit | Weight | Digit*Weight | Sum of Digits | Running Sum |
|---|---|---|---|---|
| 1 | 1 | 1 | 1 | 1 |
| 3 | 3 | 9 | 9 | 10 |
| 0 | 1 | 0 | 0 | 10 |
| 0 | 3 | 0 | 0 | 10 |
| 0 | 1 | 0 | 0 | 10 |
| 1 | 3 | 3 | 3 | 13 |
| 7 | 1 | 7 | 7 | 20 |
| 3 | 3 | 9 | 9 | 29 |
| 5 | 1 | 5 | 5 | 34 |
| 0 | 3 | 0 | 0 | 34 |
| 7 | 1 | 7 | 7 | 41 |
| 6 | 3 | 18 | 9 | 50 |
| 4 | 1 | 4 | 4 | 54 |
| 0 | 3 | 0 | 0 | 54 |
| 5 | 1 | 5 | 5 | 59 |
| 8 | 3 | 24 | 6 | 65 |
| 4 | 1 | 4 | 4 | 69 |
| 1 | 3 | 3 | 3 | 72 |
| 0 | 1 | 0 | 0 | 72 |
| 3 | 3 | 9 | 9 | 81 |
| 6 | 1 | 6 | 6 | 87 |
|   |   |   |   |   |
| 3 |   |   |   |   |

FIGURE 10

LEVEL 3 ENVELOPE

⎯1000

Format Designator Value – 3     Example – 3 000173 5   0764058410 3   6

1 Digit Format Designator Value = 3  ⇐ 1001
   6 Digit Biller Identification Number ⇐ 1002
   1 Check Digit of preceding 6 digits using 371371 weights, MOD10 algorithm ⇐ 1003
   Number of Components (1 Fixed Length (7), 1 Variable Length) (By Definition) ⇐ 1004
   Customer Account Number with embedded (and known algorithm) check digit (3) ⇐ 1005
   Calculated check digit of Level 3 data using 2121... weights, Split MOD10 algorithm (6) ⇐ 1006

FIGURE 11

LEVEL 3 ENVELOPE

⎯1100

Format Designator Value – 4     Example – 4 000173 5   0764058410 3   4

1 Digit Format Designator Value = 4  ⇐ 1101
   6 Digit Biller Identification Number ⇐ 1102
   1 Check Digit of preceding 6 digits using 371371 weights, MOD10 algorithm ⇐ 1103
   Number of Components (1 Fixed Length (7), 1 Variable Length) (By Definition) ⇐ 1104
   Customer Account Number with added check digit to be discarded before presentment to biller (3) ⇐ 1105
   Calculated check digit of Level 3 data using 2121... weights, Split MOD10 algorithm (4) ⇐ 1106

FIGURE 12

VALID ACCOUNT NUMBER

| Checkout Scanner | Retailer Host Processor | DCNI unit |
|---|---|---|
| [1201]→ Read Bar Code → | | |
| [1202]→ | Validate Bar Code → | |
| [1203]→ | | ← ACK, return Biller Name/Account # |
| [1204]→ ← Query Amount to be paid | | |
| [1205]→ Amount → | | |
| [1206]→ | Bar Code + Amount → | |
| [1207]→ | | Store Transaction Data |
| [1208]→ | | ← ACK, return Transaction ID |
| [1209]→ ← Print Biller Name, Account #, Transaction ID | | |

FIGURE 13

INVALID ACCOUNT NUMBER

| Checkout Scanner | Retailer Host Processor | DCNI unit |
|---|---|---|
| [1301]→ Read Bar Code → | | |
| [1302]→ | Validate Bar Code → | |
| [1303]→ | | ← NAK, return reason code |
| [1304]→ ← Reject Payment | | |

| BillerName | BatchNumber | CardTBatchID | CardTID | AccountNumber | Amount |
|---|---|---|---|---|---|
| Pacific Bell***Van Nuys | 10/11/2000 14:27:13 | 1475602000101111142713 | 67 | 3232355419925 | 28.92 |
| Gas Company | 10/11/2000 14:28:57 | 1494292000101111140848 | 38 | 04142597006 | 62.74 |
| Gas Company | 10/11/2000 14:30:57 | 1516902000101111143057 | 30 | 09212229000 | 52.57 |
| Gas Company | 10/11/2000 14:30:57 | 1516902000101111143057 | 31 | 10472233278 | 22.09 |
| Pacific Bell***Van Nuys | 10/11/2000 14:32:27 | 1513332000101111141214 | 37 | 3232343487096 | 83.51 |
| Pacific Bell***Van Nuys | 10/11/2000 14:32:27 | 1513332000101111141214 | 38 | 3232330153356 | 16.47 |
| Pacific Bell***Van Nuys | 10/11/2000 14:32:27 | 1513332000101111141214 | 39 | 3232345545400 | 43.11 |
| Pacific Bell***Van Nuys | 10/11/2000 14:37:08 | 1511652000101111143708 | 23 | 3237213017757 | 26.15 |
| Verizon***PO 30001 | 10/11/2000 14:37:08 | 1511652000101111143708 | 24 | 01286311971413204 | 16.51 |
| Gas Company | 10/11/2000 14:39:13 | 1494292000101111143913 | 39 | 13792569355 | 19.69 |
| Gas Company | 10/11/2000 14:39:13 | 1494292000101111143913 | 41 | 11872356669 | 14.87 |
| Gas Company | 10/11/2000 14:41:13 | 1524112000101111130043 | 30 | 18460075338 | 25.92 |
| Pacific Bell***Van Nuys | 10/11/2000 14:41:13 | 1524112000101111130043 | 31 | 3235664941063 | 23.30 |
| Pacific Bell***Van Nuys | 10/11/2000 14:41:31 | 1527962000101111144131 | 26 | 7149721087141 | 134.83 |
| Pacific Bell***Van Nuys | 10/11/2000 14:41:31 | 1527962000101111144131 | 27 | 7145422082046 | 78.45 |
| Pacific Bell***Van Nuys | 10/11/2000 14:41:31 | 1527962000101111144131 | 28 | 7146670583861 | 34.92 |
| Pacific Bell***Van Nuys | 10/11/2000 14:42:52 | 1513332000101111141214 | 40 | 3232354980440 | 59.21 |
| Gas Company | 10/11/2000 14:48:05 | 1520612000101111144805 | 29 | 04980034310 | 5.89 |
| Pacific Bell***Van Nuys | 10/11/2000 14:48:05 | 1520612000101111144805 | 28 | 3232222330254 | 27.25 |
| Pacific Bell***Van Nuys | 10/11/2000 14:48:05 | 1520612000101111144805 | 30 | 3232346559356 | 170.62 |
| Edison Company***Box 600 | 10/11/2000 14:50:57 | 1524112000101111145057 | 40 | 145310983 | 17.98 |
| Gas Company | 10/11/2000 14:50:57 | 1524112000101111145057 | 32 | 15810083004 | 9.45 |
| Gas Company | 10/11/2000 14:50:57 | 1524112000101111145057 | 35 | 1615007576 | 51.70 |
| Gas Company | 10/11/2000 14:50:57 | 1524112000101111145057 | 37 | 11100103701 | 47.93 |
| Gas Company | 10/11/2000 14:50:57 | 1524112000101111145057 | 41 | 02350083008 | 15.25 |
| LA Municipal Services***Box 10324 | 10/11/2000 14:50:57 | 1524112000101111145057 | 39 | 10697621007800090002501 | 137.22 |
| Pacific Bell***Van Nuys | 10/11/2000 14:50:57 | 1524112000101111144113 | 33 | 3235835923416 | 30.67 |
| Pacific Bell***Van Nuys | 10/11/2000 14:50:57 | 1524112000101111145057 | 36 | 3237524653426 | 29.25 |

Electronic Transaction Detail -- 10/11/2000 13:35:09 -- MCRPS -- Total: 17,967.98

FIGURE 20

Map Biller to Partner

| BillerID | BillerName | Cash Payment Method | Electronic Trading Partner | Memo Posting Partner |
|---|---|---|---|---|
| 00111 | Verizon***PO 30001 | Electronic | MCRPS | |
| 00112 | US West Communications***Phoenix | Electronic | USWest | USWest Memo Postings... |
| 00130 | Salt River Project | Electronic | CitiBank (inactive) | |
| 00134 | Discover Private Issue***Box 7061 | Electronic | CitiBank | |
| 00140 | Pacific Bell***Van Nuys | Electronic | MCRPS | |
| 00145 | APS | Electronic | CitiBank (inactive) | |
| 00148 | Central Maine Power | Electronic | CMP (Central Maine Pow... | |
| 00160 | American Express***Bx 2853, NY,NY | Electronic | CitiBank (inactive) | |
| 00161 | Con Edison***PO 1702 | Electronic | CitiBank | |
| 00173 | Gas Company | Electronic | MCRPS | |
| 00180 | Edison Company***Box 600 | Electronic | MCRPS | |
| 00187 | Northern Utilities, Inc.*** PO 4320 | Electronic | CitiBank | |
| 00190 | Verizon***PO 4830 | Electronic | Bell Atlantic, NJ | |
| 00191 | PSE&G***NJ | Electronic | CitiBank | |
| 00198 | Discover Card***1730 South | Electronic | CitiBank | |
| 00201 | Texaco***Tampa | Electronic | CitiBank | |
| 00209 | Cablevision of NYC***Soundview Av | Electronic | CitiBank | |
| 00228 | AT&T Universal Card Services***Columbus | Electronic | CitiBank | |
| 00256 | PG&E***Embarcadero Drive | Electronic | CitiBank | |
| 00261 | Sprint ***PO 52243 | Electronic | CitiBank | |
| 00266 | Cablevision of Long Island | Electronic | PNM | |
| 00268 | PNM Electric & Gas Services | Electronic | CitiBank | |
| 00279 | Sprint ***PO 650270 | Electronic | MCRPS | |
| 00285 | LA Municipal Services***Box 10324 | Electronic | CitiBank | |
| 00290 | Bell Atlantic***28007 | Electronic | CitiBank | |
| 00304 | Sprint ***PO 52243 | Electronic | MCRPS | |
| 00316 | Pacific Bell ***Sacramento | Electronic | CitiBank | |
| 00348 | Discover Card*** Box 105430 | Electronic | CitiBank (inactive) | |
| 00362 | American Express***Los Angeles | Electronic | | |

Selected: 00100 - NorthEast Power and Light

Electronic Partner:
- Activate
- Deactivate
- Edit Map

Change / Electronic / Manual

Memo Posting Prtnr:
- Change
- Clear

Edit Biller ACH Details

Close

FIGURE 21

BAR CODED BILL PAYMENT SYSTEM AND METHOD

BACKGROUND OF THE INVENTION

The present invention relates to a payment system and method, and more particularly, to a system and method for paying bills using bar code identification.

The current paradigm of the bill payment cycle for goods and services rendered has improved only in incremental steps since the beginning of time. In ancient times, most goods and services were exchanged between individuals, using the common currency of the realm or by a mutually agreed upon barter arrangement. Extension of credit for goods and services was generally limited to the affluent and wealthy. When payment was due, handwritten invoices were hand delivered. Sometime later, cash payment would be remitted in person. Most trade occurred at the local level between individuals, exchanging cash or barter goods.

In the late 1800's and early 1900's in the United States, credit for goods and services rendered remained essentially unchanged at the local level. Society became less stratified and there became an affluent middle class populace between the highest and lowest levels of society. Credit for goods and services became extended to select groups and individuals within this populace as well as the affluent and wealthy. However, invoices were still handwritten tallies of goods and services rendered, which were paid for in cash. The Industrial Revolution precipitated many technology advances in transportation and communication, which affected many facets of daily life. In commerce, the foundation cornerstones of the financial services industry, as it exists today, were developed and shaped. With an infrastructure of a national mail network and a solid central banking system in place, the more affluent and wealthy individuals began to have a larger and more convenient span of financial control with extended remote banking credit services. Merchants could then send their invoices to distant customers through the national mail network and receive payments, some time later, in the form of a bank draft honored by the local bank for cash.

In the generations following World War II to the present time, with general society becoming more and more homogenized and, on the whole more affluent, banking services are available and competitive at every level. Bank checking accounts (and therefore a credit mechanism with which to pay remote billers) are available to 60 percent or more of the population. The national mail network is a very cost-effective delivery system for local and remote customers of automated or machine printed monthly invoice statements, which average 8 billion annually. Customers write checks, as payment for these invoices, and return them via the mail network. When received at the merchant directed return location (a bill payment-processing center), these mail payments are opened, the checks deposited, and the customer accounts credited with the face amount of these check payments.

If everyone were to pay their bills on or before the due date with valid checks, this state of the bill payment industry might be sufficient to satisfy most of today's societal needs. However, this is not the case. Some people never pay their bills on time, for a variety of reasons. Payments made with a check are not always covered with sufficient funds at their bank. The end-result consequence to the biller is a finite cost that is directly attributable to the disruption of the flow of goods and services through his business.

To cover the costs incurred by these late payments, billers have only two options available to them. One option is to spread this overhead cost over of all the goods and services that they provide, with the possible consequence of pricing their products or services out of the competitive price range for similar or substitute set of products and services. The second option is to impose payment penalties on those customers who pay late—for whatever reason. This second option is generally more preferable since it targets the problem population segment directly. However, billers are often unable to recover the full cost of late payment consequences from those customers and still stay within the public legal and regulatory mandates.

Recently, there have been business attempts to further automate the bill payment process by the electronic delivery of biller invoices and the subsequent electronic remittance of payments. While the electronic presentment of bill payments might address the current 15% or so of the U.S. population with access to the Internet, it does not address the 85% without Internet access. Within the next decade, the Internet wired segment of the population will not grow as fast as the current crop of "dot com" entrepreneurs hope or project in their "new" economy business plans. The latest statistics show that less than 3% of the American public may use on-line remittance services.

Federal statistics indicate that fully 30–40% of the U.S. population may be "unbanked". The "unbanked" population operates solely within the cash economy without any formal banking level traceability. There are many reasons that people prefer to operate in this economy, some of which are culturally related. Others prefer anonymity for quite specific reasons, such as illegal aliens avoiding detection and deportation by the INS or others hiding their sources of income from the IRS. Federal statistics also indicate that 30–40% of the adult U.S. population may have a working fourth grade education or less.

There may be a correlation between those people opting for the cash economy and the fact that many may not be able to maintain and balance a checkbook. Most people would rather admit to being "unbanked" rather than to being illiterate. The "unbanked" segment of the population has difficulty operating in a check-oriented society and paying their monthly bills to remote billers. At the local level, the proprietor-operated check cashing storefronts may service some of the needs of these individuals. Weekly paychecks are cashed for a transaction charge (mostly based on the face value of the check), and money orders are then bought, to be enclosed with mailed bill payments. When bill payments are long past their due date, these individuals may have to resort to more expensive electronic wire services to avoid service disconnects.

For the great majority of printed bill payment invoices that are distributed every month, each biller automates and optimizes its bill collection and remittance process to suit the requirements of its installed paper handling equipment and flavor of customer account numbering assignments and schemes. Bill remittance stub sizes and formats vary from postcards printed with dot matrix printers to full-page 8½" by 11" sheets with laser printed invoice information on pre-printed forms. Each has a tear-off bill remittance stub portion that is then mailed back with a check payment. Account numbers on these bill remittance stubs appear in different (and sometime multiple) spatial positions, formats and fonts. While still not universal, most billers have formatted their account numbers (and other customer related information) on bill remittance stubs in Optical Character Recognition (OCR) readable scan lines. Some of this information is printed twice on the bill remittance stub as a contingency that the paper bill remittance stub is shredded or mangled by the automation equipment. Human data entry of this customer account number information is the ultimate fallback mode for processing this payment.

FIG. 1 shows an exemplary local gas company remittance stub 100 utilizing this manner of design. The biller in this example has assigned a numeric account number to each of his customers. As shown in FIG. 1, the customer account number is printed three times, the human readable one 102 under the "Your Account Number" heading, and the other two 103, 104 printed twice in machine-readable form. Account number check digits 101 are used to validate the account number. Each digit in the account number is multiplied by a mathematical weight, and then all these products are added together. Dividing the total sum by 10 and complementing the remainder yields the check digit that is compared against the indicated digit. If the digits match, then the account number has been detected and read correctly. Check digits are employed to eliminate two types of common errors, physical digit read errors and transposition errors (when the customer account number is processed manually).

FIG. 2 shows an exemplary remittance stub 200 from a local power company that assigns a combination of letters and digits to its customer base. There are two forms of the customer account number 201 that appear on the bill remittance stub. The first 201 is designed to be human readable because it appears within a printed text box labeled "Account Number". The last digit in the Account Number box is the customer account number check digit. The second form of the customer account number 202 appears in machine-readable form and is embedded in the OCR scan line (underlined for illustration). The leading "4" digit is the customer account number check digit and the remainder of the underlined portion of the OCR line are the digits that can be mapped into the human readable "Account Number" form. The format of this machine-readable OCR scan line 202 is probably a confluence of many internal design decisions, based on several factors. From a human ergonomics perspective, a customer service representative of the power company, during a service call, would never ask a customer to recite his account number from a sequence of digits appearing within the machine-readable OCR line and expect a correct answer. The human readable form 201 of the customer account number is easier for a customer to recognize and to dictate over the telephone when requesting service changes to his account.

These two examples illustrate the primary uses of duplicate account information printed on a bill remittance stub—one for simplicity when verbally referring to a specific customer account and the second for the case that the automation process fails and customer account number payment information has to be entered manually.

FIG. 3 shows an exemplary remittance stub 300 from a gas company, in which the biller automates part of the bill payment remittance process by including, on the bill remittance stub, company proprietary bar coded information 301 that does not appear to be related in any way to the printed customer account number. While the format of this bill remittance stub 300 may marginally advance that biller's state-of-the-art bill collection and system processing with the use of newer and improved automation equipment, it does not significantly decrease, in favor of the customer, the overall bill payment cycle. The great majority of the bill payment cycle time consists of non-deterministic time delays in the national mail network during the biller-to-customer and the payment-to-biller delivery paths. These random time delays, combined with very short biller dictated due dates and (possibly intentional) delayed processing times, always work to the detriment of the customer. As a result, some customers are assessed penalty payments, which are sometimes more profitable than the basic goods and services provided.

The system of bill payment invoicing, collection and remittance processing remains a fragmented industry because there are no common bill remittance stub format standards, no common customer account number representation standards, no common, expedient data and money delivery mechanisms to the biller, and no large bill remittance stub processing networks, in addition to payment cycle delays that always work to the detriment of the customer to favor the biller (with a correspondingly greater profit margin). By constructing a common set of standards from the current set of available technology components, a universal national bill payment network could be implemented that addresses the above list of industry problems, resulting in a positive economic impact to the business community at large. For such a set of standards to work, the cooperation of several large organizations would be required; however increases in raw profit and new business growth opportunities should induce such cooperation.

As shown in FIG. 4, a system 400 consistent with the existing bill payment paradigm uses the national mail network and biller payment processing centers to convert physical paper into electronic data and bank credits. The current bill payment network is a paper based network that primarily relies on the central banking system for processing customer remitted bank draft payments and the national mail network for customer invoice delivery and the return of mailed bill payments. In system 400, for all the goods and services rendered to a customer over a given billing period, the biller accounts receivable 401 accumulates a dollar total and generates a detailed machine printed invoice (which may take 4–5 days after account cut-off time to process) that is sent to the customer 403 via U.S. Mail 402. The customer (i.e. payee) 403 typically receives the invoice 2–3 days later (which time is variable, without any direct traceability from the perspective of either the biller or the customer).

Once the customer receives the invoice in the mail, the customer makes out a check payment or procures a money order 404 to remit with a mail payment, which occurs sometime later, depending on the availability of cash resources and other circumstances. The customer mails the payment via U.S. Mail 405 to the biller collection and processing center 406, where processing time may be 2–3 business days or more (which time is variable, without any direct traceability from the perspective of either the biller or the customer). At the bill payment processing center 406, the following operations are typically performed: opening all received mail; microfilming and/or otherwise recording all received payments; electronically reading and processing OCR bill remittance stub information; preparing all received check or money order payments for bank submission; and electronically remitting bill payment data, based on check payment verification. Processing time within the processing center 406 may be 2–3 days.

It should be noted that there may be sanctioned late payment penalties imposed on credit card payments, wherein a biller might gain an advantage by intentionally delaying an on-time payment by a day or so, thereby causing an otherwise on-time payment to be considered late. For example, for a $200 payment delayed by only one day, a $25 late payment penalty might result in an equivalent Annual Percentage Rate (APR) interest rate of 150%, for little or no marginal cost to the biller. This overcharge, which may be difficult for the customer to trace later, may be compounded by another finance charge for the outstanding unpaid balance amount, made late by that intentional delay.

Payment data is next remitted electronically from the processing center 406 to the biller's bank 408, and processing and distribution of electronic payment data is typically done using the Federal Reserve Automated Clearing House (ACH) Network 407, which typically takes 6–9 hours. At the biller's bank 408, the electronic payment data is received from the ACH Network, stripped and reformatted according to biller specified formats, which may take 4–6 hours. Finally, the biller's accounts receivable 401 and/or customer service computer files are updated. Depending on the "legacy factor" of the biller's computer processing systems, this process can range anywhere from 2–3 hours to 4–5 days.

Assuming zero latency on the part of the customer paying his bill, the cycle time between the customer account cut-off time and the time that the customer payment is applied to his account, using the above time estimates, may range from 13–18 days. Since there is usually some customer delay, the observed bill payment cycle time will be longer.

SUMMARY OF THE INVENTION

It is therefore an object of the present invention to provide a system and method for bill payment wherein a national electronic network with a plurality of retail outlets configured for bill payment may be established.

It is another object of the present invention to provide a system and method for bill payment wherein billers benefit by receiving accurate electronic payments delivered in a timely manner, which payments may be directly applied to their accounts receivable.

It is a further object of the present invention to provide a system and method for bill payment wherein bill paying customers benefit by having an electronically time stamped traceable payment that is electronically delivered and expediently applied to their account following payment, and wherein no personal computer or other equipment is required.

It is still another object of the present invention to provide a system and method for bill payment wherein participating retail establishments may obtain a relatively cost-free profit margin from each bill payment transaction processed.

It is still a further object of the present invention to provide a system and method for bill payment wherein a uniform bar code "signature" system is used to identify bill paying customers, billers, and other transactional information from a single bar code printed on a customer remittance.

The present invention involves the transmission of payment information via one or more networks (e.g. the Internet and the Federal Reserve ACH Network) to billers of consumer goods and services. This payment information is captured using existing scanners in cash register systems at supermarkets, chain stores, or other retail outlets. Retailers gain access to a valuable affinity draw because everyone has bills to pay regularly. Billers save millions of dollars in collection and processing expenses. Consumers are provided a convenient way to pay any bill quickly and flawlessly for a nominal transaction fee (e.g. $1.00 per bill).

A bill payment system and method consistent with the present invention relies on an additional ISO standard printed bar code on the biller invoice, which is then delivered to the customer via the national mail network. Thereafter, payment information and payment credits are returned to the biller electronically. With the proliferation of the Universal Product Codes (UPC) that are imprinted on every retail product today, an infrastructure for processing bar coded information is already in place. At supermarkets, bar code scanners at all the checkout aisles are used to register the sale of all items for inventory and pricing purposes. Bar coded bill payments would be just another commodity item to be paid for, accepted at retail. Upon receiving a bar coded payment invoice, the customer could go to any supermarket, chain store, post office, or other location which accepts this type of payment, to pay his bill. In return for the nominal transaction fee paid, a customer might receive a printed detailed proof of payment receipt. Billers could be notified immediately and agree to suspend all collection activities, and account posting could take place within 36 hours, all funds remaining within the Federal Reserve Banking system. No state banking licensing would be required, since each biller's approval is secured by means of a biller registration process, which introduces the technical specifications and certification parameters necessary for billers to participate in a system consistent with the present invention.

As a participating retail establishment provides bill payment services to the public, it also forms a new portal. A proprietary router/application interface may be non-invasively attached, indirectly, to the retailer's checkout scanner. Through this portal, other services can be offered to consumers. For example, in addition to payments, money transfers (a financial services which may be lucrative to provide) may be provided through a system consistent with the invention. Bank account transactions such as deposits may be made or Internet wallets replenished. Though not required, the U.S. Postal Service (USPS) could be offered a new income stream for simply authorizing this system. The power of an "electronic" postmark may impact the way billers view this system.

It is contemplated that the retail industry should provide advertising as they promote the affinity pull they already wish to impart upon the consumer marketspace. The community of consumer billers should provide cooperation because of the potential of this system to reduce what are now very expensive embedded collection costs. Consumers need another way to pay their bills more efficiently than the U.S. Post Office mail can do so today, especially for those without bank accounts or those who desire to use credit for bill payments, and clearly for those who are late. A system consistent with the present invention therefore benefits billers, consumers and retailers who participate, and may be inexpensively and easily established and maintained.

A bill payment system consistent with the invention comprises a biller generating at least one invoice for at least one customer, the invoice comprising a unique bar code comprising data identifying at least the customer and the biller, and a scanning apparatus configured to scan the bar code and, based on the identifying data of the bar code, to effect payment to the biller in a predetermined amount. In method form, a bill payment method consistent with the invention comprises: generating an invoice for at least one customer, said invoice comprising a unique bar code, said bar code comprising data identifying at least said customer and said biller; and permitting a third party to scan said bar code and, based on the identifying data of said bar code, to effect payment to said biller in a predetermined amount.

In another embodiment, a bill payment network consistent with the invention comprises a plurality of billers, each biller generating an invoice for at least one customer, the invoice comprising a unique bar code comprising data identifying at least the customer and the biller, and a plurality of third parties in communication with the billers, each third party capable of scanning the bar code and, based on the identifying data of the bar code, effecting payment to the biller in a predetermined amount. In another embodiment, a bill payment method consistent with the invention comprises: receiving an invoice from a biller, said invoice comprising a unique bar code, said bar code comprising data identifying at least a customer and said biller; and permitting a third party in communication with said biller to scan said bar code and, based on the identifying data of said bar code, to effect payment to said biller in a predetermined amount.

BRIEF DESCRIPTION OF THE DRAWINGS

FIG. 1 is an exemplary prior art remittance stub from a utility company;

FIG. 2 is another exemplary prior art remittance stub from a utility company;

FIG. 3 is another exemplary prior art remittance stub from a utility company;

FIG. 4 is a process flow diagram of an exemplary prior art bill payment system;

FIG. 5 is a process flow diagram of an exemplary bill payment system consistent with the present invention;

FIG. 9 is a table illustrating the results of an exemplary split modulus matching calculation in one embodiment of the present invention;

FIGS. 10 and 11 are illustrations of an exemplary Level 3 envelope in one embodiment of the present invention;

FIGS. 12 and 13 are process flow interaction diagrams of the mainline transaction information interchange between the checkout scanner, retailer host processor, and data collection network interface (DCNI) unit in processing a bar coded customer bill remittance stub, in one embodiment of the invention;

FIG. 18 is an exemplary electronic transmission interface (ETI) display screen, in one embodiment of the invention;

FIG. 19 is an exemplary ETI transaction detail display screen, in one embodiment of the invention;

FIG. 20 is an exemplary ETI map biller-to-partner display screen, in one embodiment of the invention; and FIG. 21 is an exemplary transaction browser display, in one embodiment of the invention.

DETAILED DESCRIPTION OF PREFERRED EMBODIMENTS

Bill Payment System

Figures 6, 7, 8:
FIG. 6 is an illustration of an exemplary data structure of elements underlying the bar code "signature" in one embodiment of the present invention.
FIG. 7 is an illustration of another exemplary data structure of elements underlying the bar code "signature" in one embodiment of the present invention.
FIG. 8 is an illustration of an exemplary bar code bill payment "signature" in one embodiment of the present invention.

Turning now to FIG. 5, a bar coded bill payment based system 500 consistent with the present invention utilizes a bar code on the biller invoice, which is then delivered to the customer via mail, and payment information and payment credits are returned to the biller electronically. Advantageously, nationally recognized and federally sanctioned payment electronic networks may be utilized for remitting customer payment data and funds. For all the goods and services rendered to a customer over a given billing period, the biller's accounts receivable 501 accumulates a dollar total and generates a detailed machine printed invoice including a special bar code, which is mailed to the customer 503 via U.S. Mail 502. Time for processing and mailing may be 4–5 days after account cut-off time, and the mail transit time to the customer may add an additional 2–3 business days or more before the customer receives the invoice (which time is variable, without any direct traceability from the perspective of either the biller or the customer). The customer 503 then receives the invoice in the mail. Sometime later when cash resources are available, or depending on other factors, the customer 503 decides to pay bill. The time for this to occur is variable, depending upon the customer's circumstances.

To pay the bill, the customer 503 takes the bar-coded invoice to a participating store (e.g. a supermarket) that processes bill payments. The customer presents his bar-coded bill remittance stub to the checkout cashier for scanning at the checkout scanner 504, which may be done while paying for other UPC-coded items. Instead of looking up an in-house UPC code for pricing, the scanner 504 picks up the bill payment bar code that identifies the biller to be paid and the account number to be credited. The customer informs the checkout cashier the amount to be paid on that account, payment is tendered to the cashier, and the cashier inputs the amount to be paid into a terminal which is in communication with a backend host processing system 505. Upon receiving payment from the customer, that bill payment is then complete. The check out of any remaining products and items (or bills) continues until the complete total for all goods and services is calculated. The customer may receive a printed receipt of the payment tendered with date and time that the payment was made. The backend host processing system 505 forwards all the payment data to the data collection network interface 506 ("DCNI"). The processing time for all of the payment steps may be as little as a few seconds. Moreover, payments made in this manner are time-stamped, so that once payment is made, the customer may rest assured that payment has been timely acknowledged.

The data collection network interface 506 collects and stores all the customer payment data in non-volatile memory. Periodically throughout the day (based on time and transaction volume thresholds), or at other predetermined intervals, the interface 506 transmits the payment data to the central site transaction collection system 507. Additional transmissions may be scheduled before the daily transaction collection system 507 aggregation times. The time for the back-end and collection system processing has no impact on customer payment time, since all payments may be time-stamped. Separately calculated calendar day payment counts and totals may also be sent to the transaction collection system 507 as an independent transaction audit balancing mechanism. The transaction collection system 507 may continuously receive payment data information from a distributed network comprising a plurality of data collection network interface units 506 deployed at field retail establishments. Before the last processing window closes at the Federal Reserve Automated Clearing House (ACH) Network 508, all customer payments are sorted and aggregated for direct remission to their respective billers, which may take approximately an hour. Processing and distribution of electronic payment data is done using the Federal Reserve Automated Clearing House (ACH) Network 508, which may take 6–9 hours. At the biller's bank 509, the electronic payment data is received from the ACH Network, stripped and reformatted according to biller specified formats, which may take 4–6 hours. Finally, the biller's accounts receivable 501 and/or customer service computer files are updated. Depending on the "legacy factor" of the biller's computer processing systems, this process can range anywhere from 2–3 hours to 4–5 days.

Assuming zero latency on the part of the customer paying his bill, the cycle time between the customer account cut-off time and the time that the customer payment is applied to his account, using the above time estimates, may range from 9–12 days (in contrast to the 13–18 days of the prior art system). Since there is usually some customer delay, the observed bill payment cycle time will be longer.

Moreover, if the biller recognized the customer payment date and time as the creditor date of receipt as specified in the Federal Reserve Regulation Z, Section 226.10, then the total bill payment cycle time would be reduced to 6–8 days. Explicit agreement from the biller would be secured through the biller registration process. The biller may validate the customer payment date with the transaction embedded "electronic postmark", which can not be performed within the current frameworks of either the paper based bill payment or the electronic payment paradigms, today.

In addition to the more than 55% time reduction in the bill payment cycle, other advantages of the present invention include: customer choice of local bill payment locations, electronic application of bill payments to account within 24–36 hours, a reduction in bill payment errors with machine-readable bar coded account numbers, and time stamping of bill payments at the time payment is tendered. Electronically delivered bill payments, under the present invention, are much cheaper for the customer to pay for and less expensive for the biller to process through its remittance processing center and accounts receivable systems than under a prior art system. Additionally, banks that process data from the ACH system will have more chargeable services to offer their biller customers. Furthermore, billers can incorporate this bar coding standard into their bill remittance processing centers, as older OCR recognition equipment is replaced with simpler and more reliable laser bar code scanning equipment. With sufficient planning, a biller, contemplating a conversion of one or more legacy customer account numbering systems to a simpler, newer scheme, can use this system of bar coding in its conversion process. In an alternative embodiment, electronic invoice delivery, whereby the customer receives and prints the bar-coded invoice at his own computer system, may be used to reduce the time and labor required for the biller to prepare and mail invoices to the customer.

It is further contemplated that billers would register with a centralized organization in order to receive an assigned biller bar code, just as all companies must register with the Uniform Code Council (UCC) to get their Universal Product Code (UPC) assignment for their products.

It should be understood that the foregoing described embodiment which uses the in-store scanner and retail host back-end machine as a means of detecting, reading and processing the bill payment bar codes is but one embodiment, and these components are not described herein as limitations. For example, another method might utilize a personal computer, terminal, or other equipment having a bar code capable scanner, receipt printer and an interface to the data collection network interface in place of the in-store system. Ideally, such a computer would have the same functionally equivalent interface as the in-store system. In fact, it is contemplated that, as a transitional measure, until the retail stores modify or update their in-house check-out software systems to accommodate the data collection network interface, a simple PC might operate in its place and serve as a model prototype to demonstrate the operational aspects of this system.

Bar Coding Validation

Prior art systems have concentrated on the visual aspects of bill remittance stub recognition, detection and validation against potential fraud, typically using optical character recognition (OCR). The present invention applies a bar code solution to the general bill payments problem, rather than a new variant or improved OCR technique. Bar code is more efficient than OCR by several magnitudes because bar codes can be detected reliably and processed by relatively simple hardware and firmware, whereas OCR requires long physical scan times and significant host CPU processing requirements for character recognition (and then only for a selected set of fonts). Bar code consists of binary elements that are parity checked for every bar code symbol and globally checked digited at the message level. OCR consists of many analog segments that have to be neurally correlated and matched to the human readable character set with no internal self-checking controls. In short, bar code is the future digital solution whereas OCR is a dated analog solution that still plagues most bill payment processes today.

The Universal Product Code (UPC), printed on most retail products today, is a 12-digit number that is a concatenation of four numeric fields—a classification number (1), a producer identification number (5), a product identification number (5), and a check digit (1). The need for a standards authority first arose in 1972 when the supermarket industry decided to mark each of the grocery point-of-sale packages with a unique identifier to speed checkout transactions, therein creating an organization that today is called the Uniform Code Council (UCC). The underlying bar code symbology is merely a convenient representation of this UPC code format that can be reliably detected by simple point-of-sale scanning equipment (thus, it does not matter which particular bar code is used).

There is no standard way of representing multiple data fields in a single scan line, given the designs and formats of various bar code standards and conventions commonly in use today. For a typical bill payment application, two fields are minimally required—a 6–7 digit biller identification and a variable length (up to 22 characters or more) alphanumeric customer account number. If these fields were concatenated in a fixed format in a single bar code scan line on a bill head, it is very doubtful that low skilled retail help would reliably scan the correct bar code where multiple bar codes might appear on a given bill head. To perform error-free data validation on this scan line, more information must be embedded within the data itself.

In the retail environment where bar coded products abound, there is a distinct need to determine that a bar code, submitted for processing, is correct and valid for the target bill payment processing application. One cannot assume that the retailer will always submit a valid bar code from a bill remittance stub that may contain more than one printed bar code sequence. If, for example, a utility company prints the new bill payment bar code, in addition to an already existing internal routing bar code, the two bar codes must be disambiguated. While the utility company can easily distinguish its own internal routing code by its printed position on the bill remittance stub, a retail cashier might not know which to present. The solution is for the cashier to use trial and error. If the first bar code attempted does not validate, the second (or third, etc.) should be scanned. Validating a bar code bill payment "signature" in the course of the bill payment process is a component of an embodiment of the present invention.

By using a unique bar code "signature" having multiple levels of data validation implemented by check digit algorithms, a bar code scanning system may reliably recognize and validate a valid bill payment bar code. The concept of paper envelopes may be used as an analogy for relating the validation method of the invention. In the embodiment described herein, three "envelopes" are used (although those skilled in the art will recognize that any number of "envelopes" or levels of validation may be used), the first being inside the second, and the second inside the third. At the outermost layer, the third "envelope" has printed, on the outside, the bill payment bar code "signature". If the bar code is detected and read correctly by the hardware scanner, the resulting alphanumeric information is valid in that it compared correctly with the embedded encoded bar code check symbol. If this first operation is successful, the "envelope" is opened. The directions printed on the inner "envelope" specify to calculate a check digit on the resulting alphanumeric information derived from the bar code, comparing the calculated result against the last digit in the string. If this second operation is successful, the next "envelope" is opened. The printed directions on the innermost "envelope" specify to use the format designator digit(s) to decode and to verify the data integrity of the embedded component data elements. Each of these data elements should be verified by calculating their check digits and by utilizing other independently available data validation checks.

If all three levels of validation successfully pass muster, then a valid bill payment "signature" has been detected and the resulting data should then be passed to the target bill payment application for subsequent processing. Failure at any intermediate validation level results in a negative acknowledgement. The prime purpose of this bar code "signature" design is to unconditionally identify the detected scanned bar code as being proprietary to the present invention, in the absence of any other external information, through multiple layers of check digit information, format designator indicators and local data validation schemes.

A number of different application "signature" formats may be implemented within a bar code scan line as a series of successive embedded "signature" data fields. In one embodiment, each signature data field consists of three elements: a format designator ("fd") consisting of one or more digits, a data field ("data") consisting of one or more fixed or variable length sub-data fields, and a check digit ("cd") algorithm associated with the format designator and the level at which it appears.

FIG. 6 illustrates a bar code "signature" 600 in one embodiment of the invention, utilizing four levels of successive embedded "signature" data fields. The Level 1 data validation 601 is simply the hardware decode of the bar code symbology, using the embedded check symbol character as data validation—i.e., all the bar code symbols were detected and processed correctly. Applicability of the data to the intended target application is demonstrated when all the remaining levels of validation are successful. As shown in FIG. 6, Level 2 data validation 602 consists of one signature data field (although it could have had more). The data validation of the Level 2 signature data field consists of two checks—that the format designator value (for that level) is correct and that the check digit calculation for the data string consisting of the format designator digit(s) and the data field digits matches the check digit character. The Level 2 format designator defines at least three characteristics: the check digit algorithm implementations (in this example, 1), the number of data elements (in this example, 1), and the number of trailing discard characters for bar code odd/even count padding (in this example, 2). The number of unique combinations of the above three characteristics will determine the number of format designator values required at this level. For this example, there is only one check digit algorithm to disambiguate target applications, there is only one data field element, and there are two padding character combinations for the Code 128 bar code. Thus, the total number of format designator values required at this level is two.

The Level 3 signature data field 603 checks operate on the residual Level 2 data. The Level 3 data validation checks are similar to the Level 2 checks and the format designator defines at least these three characteristics: the check digit algorithm implementations (in this example, 1), the number of data elements (in this example, one fixed, one variable or fixed), and the field lengths for one or more data elements. As shown in FIG. 6, there are two data element fields. The number of data splits defined for this data field would determine the number of format designator values that are required for this level.

The fourth 604 to nth 605 levels comprise a continuing iterative process of Level 3. Depending on the attributes or properties that one arbitrarily assigns to the data (and hierarchical functions) at each level determines the number of format designator values required at that level. The target application receives all the data fields from the final level of data validation.

A carefully chosen set of conventions for the format designators at each level will facilitate correct data field parsing with the additional security that multiple levels of check digit validation will ensure data integrity and "positive ownership" to the target application. The format designator digit(s) do not necessarily have to be leading as illustrated above. An alternative format for the leading format designators could be as is illustrated in the bar code signature 700 of FIG. 7, in which the data strings precede the format designator digits.

With reference to the exemplary embodiment shown in FIG. 6, a sample format of the unique bar code bill payment "signature" 800 is shown in FIG. 8, as a multiple layered data validation scheme. A bar code typically consists of 6 sections: (1) a quiet zone (~0.25" of white space) before the bar code; (2) a unique bar code symbol that represents the "START" character; (3) bar code symbols representing data characters (1300017350764058410363); (4) bar code check symbol that represents a calculated check digit of the preceding data character block; (5) a unique bar code symbol the represents the "STOP" character; and (6) a quiet zone (~0.25" of white space) after the bar code. If the hardware decode of this Level 1 envelope data string is not successful, the retail cashier should not get a good bar code scan confirmation. If the hardware decode is successful, the retailer cashier should get a good bar code confirmation (but not necessarily of a valid product code). A good hardware decode of a bar coded scan line is defined as the detection of valid bar code symbols within the string that, when processed through the defined check digit algorithm, matches the embedded string check symbol character. This is the first level of data validation check that must pass.

When the bar coded data characters are decoded from this scheme of variable width white and dark bar patterns, the result is the following string of (alpha)numeric characters: 130001735076405841036 3. Calculating a split modulus 10 check digit for the string to match against the last character, using a 1313 . . . mathematical weighting scheme, results in the table of calculations illustrated in FIG. 9. The Level 2 format designator value (1) is chosen to indicate the check digit algorithm (Split Modulus 10 with mathematical weights of 1313 . . . ), the number of data field elements (1), and number of trailing padding characters (0) to utilize the high density Code 128 Type C symbol set. The Level 2 format designator value (2) is chosen to indicate the check digit algorithm (Split Modulus 10 with mathematical weights of 1313 . . . ), the number of data field elements (1), and number of trailing padding characters (1) to utilize the high density Code 128 Type C symbol set. The modulus (or the remainder) of the resulting sum of the digits (87 divided by 10) yields 7. The complement of the remainder 7 yields 3 (10−7=3). This calculated result is the check digit of the above digit string, and successfully matches the last digit in this illustrative example. This is the second level of data validation check that must pass. If this validation is successful, the operation proceeds to the Level 3 envelope data decode and validation algorithms.

In this particular example, there are only three levels of validation defined. The Level 1 check is a hardware validation data check. The Level 2 check is a pre-qualifying software validation data check. The Level 3 check is an "ownership" data check (i.e. whether this is the "signature" for bill payment data under the present invention). Different "signatures" can be constructed for any number of application program uses through a judicious design scheme and the selection of format designators. Format designators are arbitrary indicators with which to properly decode the format of and to validate the ensuing data string—in this case, the format designator is placed as the first (one or more) leading digit(s). At different levels, the same format designator values can have different meanings.

Turning now to FIGS. 10 and 11, two format designator values have been chosen in this example (at Level 3) to encapsulate six format and validation data characteristics—all of which must be correct for the third and final data validation check to pass. The Biller ID in each of these examples is "173" in a 6-digit numbering system. The embedded spaces in the encoded data examples 1000 and 1100 of FIGS. 10 and 11 are not significant and are inserted to show more clearly the various fields within the example digit strings. The six format designator characteristics shown in FIGS. 10 and 11 define either format (1, 2, 4, 5) or data validation (1, 2, 3, 6) checks. A format characteristic defines the layout of the data whereas a validation characteristic facilitates data checking. To validate a unique bar code application program "signature", the more dependencies that exist within the data at each level for subsequent cross checking and validation, the better. In the illustrations of FIGS. 10 and 11, there are two format designator examples with all possible variants within several constraints that are checked and validated. Where there might be several different Level 2 check digit algorithms employed, a Level 3 dependency is checked. Condition #1 is checked against valid range of format designator values for the current Level (in this case 3, 4). Biller Identification Number (in this example, 173) is determined if Condition #3 is TRUE and if it exists within the list of current and valid billers (an independent table acquired by another means). Where the biller account number check digit algorithms are not known, a check digit is calculated and added to the account number—to be checked then stripped when presented to the biller (Format Designator Value=4). Where the biller account number check digit algorithm is known, it is checked against biller defined specifications (Format Designator Value=3): Conditions #1, #6. Within the Level 3 envelope for each of the above examples, the decoded and check digited values of the Biller Identification Number and the presented Biller Customer Account Number results are as follows: For Format Designator Value=3, Biller ID=173, Customer Account=07640584103; and for Format Designator Value=4, Biller ID=173, Customer Account=0764058410. This is the third level of data validation check that must pass. If all the components in the Level 3 envelope test and compare successfully, then the unique bar code bill payment "signature" has been correctly validated for further processing, and an indication is given to the retailer or cashier that a dollar amount payment should be entered for this item.

The primary purpose of this bar code "signature" design is to unconditionally identify the detected scanned bar code as being proprietary to a system or method according to the present invention, in the absence of any other external information, and to validate (using mathematical formulae and/or independent table look-up methods, if possible) all the data element components therein.

The methods and procedures by which the format designator concept could be extended are strictly an implementation issue of design schemes and an adopted set of orthogonal convention(s). While the foregoing illustrative working example uses only three levels of "envelopes" to validate the unique bar code bill payment "signature", more levels could have been used, as required. The format designators in the foregoing example utilized a fixed data format with a set of predefined check digit algorithms for each level. Possible design extensions in further embodiments might include: (1) a format designator design scheme that defines a dynamic variable number of sub-field elements and/or a set of dynamic component string lengths for each of the defined set of the sub-field elements (in contrast to the foregoing illustrated predefined fixed schemes); (2) a format designator design scheme having more than one digit in length, wherein each digit specifies an independent set of predefined orthogonal attributes that can be combined in a mix-and-match fashion (e.g. a two digit format designator would specify a primary set of attributes in the tens digit that is qualified by a secondary set of attributes in the units digit); and (3) format designator design schemes wherein subsequent trees of sub-field elements are controlled by one or more preceding levels of format designators.

Bar Coding Specifications

The bill payment application bar code printed on each bill remittance stub might minimally consist of four basic fields, printed as a single string of digits: a format designator (1 digit); a biller identification number with optional embedded check digit (7 digits); a customer account number with optional embedded check digit (22 digits); and a check digit of the previous three fields (1 digit). Of course, those skilled in the art will recognize that the number of fields and/or digits per field as described herein is specified by way of example, and not limitation, and that the number and length of fields may vary according to each embodiment of the invention. In this example, the outermost bar code envelope for this information conforms to documented ISO bar coding convention standards, utilizing an embedded check digit algorithm to verify the integrity of the entire bar code scan line data. It is strongly recommended that the biller defined customer account number also contain an embedded check digit, as a prudent secondary validation measure. If an embedded check digit does not already exist within the biller customer account numbering scheme (or the biller does not wish to disclose that information as being company proprietary), an alternate account number format provides a temporary check digit that is checked then discarded before presentment to the biller. If the detected bar code scan line data correctly passes the triple tiered and multiple embedded check digit calculations, this mechanism will virtually guarantee "defect free" biller and customer account data. Otherwise, a bill payment stub whose bar code has been mutilated or defaced by the customer is immediately rejected at the point-of-sale entry.

To accommodate future requirements, an expanded set of format designators could define new data format structures or redefine the characteristics of current data fields. The following is a possible list of characteristics that a format designator element might define within a digit string: number of sub-field elements; component string lengths of one or more of these sub-field elements; check digit algorithms to be applied to each of the sub-field elements; odd/even string packing factors when a single bar code character represents one or more digits (Code 128 is a good example of this compression feature); or subsequent trees of dependent sub-field elements. These format changes would be transparent to the end user. The bar code data, detected by the retail checkout scanner, is passed directly to the data collection network interface unit for secondary validation and translation. The parsed "translated" form of this data is then passed back to the back-end host processor system for completing the bill payment transaction at the checkout counter.

The bar code might either be printed vertically on the left (bottom to top) or right (top to bottom) hand side of the bill remittance stub with sufficient surrounding white space to satisfy the criteria of the ISO bar code format. If there are other proprietary bar codes present on the bill remittance stub, the checkout counter cashier could have the option of folding or bending the bill remittance stub such that only the required bar code is visible for a successful bar code scan of the bill payment information. Vertically printed bar codes of the format designator, biller identification number and the customer account number on most bill remittance stubs is good for a combined number sequence of 14–25 digits at the lowest common denominator bar code print resolution (nominal bar code "X" dimension $\geq 0.010$ inches and total bar code string length $\leq 3.0$ inches). For sequences longer than that, it is recommended that the bar code sequence be printed in a manner parallel to the horizontal OCR line such that extraneous proprietary bar code information can be folded out of the way for a successful scan.

The assigned biller identification number is acquired or distributed from a central registry authority, akin to the manner in which the Uniform Code Council assigns new producer identification numbers. As far as the customer account number is concerned, it is recommended that the biller include a check digit within the account numbering scheme. While it is unlikely that a customer account number would be read in error if the hardware bar code check symbol scan validates, this additional check digit provides double assurance to the biller that the customer account number is correct. This is especially important from the biller's point of view when accepting bill payments from many sources of ACH submitted data, many of which may be human entered from the myriad of home banking software packages available - known empirically to have very high human input error rates.

To this point, it has been tacitly assumed that the biller will want to print this new bar code on the face of his bill remittance stub. However, technical, as well as political, reasons could preclude the printing of a new bar code standard on the face of the current bill remittance stub. An alternative option might be for the new bar code format to be printed on the back of the current bill remittance stub (so as not to disturb the current mode of visual remittance processing) or printed on a second or subsequent tear-off bill page, formatted for that specific purpose. A further alternative would be to utilize a specially printed bar code format enclosure page (printed on better and sturdier paper stock) that would permit multiple reuse by the customer. Spare space on that enclosure could even be sold for advertising to defray the printing costs by the biller.

The most common point-of-sale bar code used throughout the retail industry is the UPC-A variant. However, most scanners employ an internal firmware auto-recognition mechanism that permits them to detect and to read several bar code symbologies. The bar code symbology, under current consideration for the most general specification of an alphanumeric customer account number, is the Code 128 family. Where there are only numerics, the Code 128 Type C variant features a high-density bar code—one printed symbol per two digits of information. During the checkout aisle scanner process, the back-end host processor recognizes a bar code data scan line as a valid bill payment transaction and requires the cashier to enter an amount to be paid. When this amount is entered, a fixed transaction fee is added to the bill payment amount. On the printed customer receipt, the bill payment is recorded in a form similar to the following, including biller name and account number, amount paid, transaction ID, date and time, and transaction fee charged:

PMNT: Biller Name

ACCT: Customer Account Number

AMNT: $ ddd.cc

TRID: rrrrrrr yjjj ssss

DATE: mm/dd/yy hh:mm

FEE: $ dd.cc

This time-stamped transaction data is then stored in the data communication network interface unit for later transmission to the transaction collection system.

Where the checkout scanner detects multiple bar codes, the retailer cashier can be trained to recognize the placement of a valid bill payment "signature" bar code to be scanned for the proper processing of a customer payment. Scanning any other bar code, present on the bill remittance stub, that does not pass all of the bill payment "signature" tests results in an immediate validation reject by the data communication network interface unit.

Back-end Host Processor

The retailer back room host processor may be required to support two well-defined interfaces, the front-end checkout counter scanner system and the back-end data collection network interface. When the Code 128 bar code format is encountered from bill remittance stubs, it should be recognized as a customer bill payment, rather than the UPC code for a customer selected product. This decision can be performed in a number of ways by the back-end host processor. The easiest logic path to implement within the back-end host processor is as follows: if this bar code scan is not recognized as one of several defined pre-programmed sequences, pass it to the data collection network interface before rejecting the scanned data completely. The back-end host processor passes the complete scan line data to the data collection network interface unit for secondary level validation and data translation. If secondary level validation is successful, the parsed translated data is passed back to the back-end host processor to complete the processing for this bill payment transaction. In this case, the returned translated data consists of the Biller Name, the Customer Account Number, and Transaction ID that is printed on the customer printed receipt.

As bill payment data is processed by the front-end checkout scanner system and completed, it may be relayed by the back-end host processor to the data collection network interface unit to be stored in non-volatile memory for later transmission to the central transaction collection system. There are a number of standard data collection network interface functions that may be accessed by the back-end host processor system, e.g. validating the biller name, adding a transaction, voiding a transaction, printing daily or weekly processed totals and reports, and setting or reading operational configuration parameters.

Data Collection Network Interface (DCNI) Unit

The retailer on-site data collection network interface unit should provide a well documented, protocol neutral features and functions front-end interface to the retailer back-end host processor. The DCNI should also provide a non-volatile memory storage capability of accumulated customer bill payment data. This may be accomplished with a solid state hardware design that is electrically isolated at all the critical interfaces and has no moving elements that mechanically wear and eventually cause the unit to fail. The back-end of the data collection network interface should provide a transparent interface to the central site transaction collection system and include functionality such as: (1) performing secure validation procedures with the transaction collection system; (2) downloading DCNI unit operating system and program application code firmware; (3) downloading DCNI unit operational configuration parameters; (4) uploading DCNI unit memory image (emergency and debug use); (5) downloading Verification Biller ID and Name data; (6) uploading transaction data (compressed & encrypted); and (7) setting DCNI unit system date or time. The primary function of the data collection network interface unit is to provide a set of support functions to the retailer host processor to aid in the collection, validation and storage of transaction data from customer bill remittance stubs scanned at the checkout counter.

FIGS. 12 and 13 illustrate the mainline transaction information interchange between the checkout scanner, retailer host processor, and DCNI unit in processing a bar coded customer bill remittance stub, in one embodiment of the invention. As shown in FIG. 12, the interaction occurring in the case of a valid account number begins with the bar code being read 1201 by the checkout scanner and passed to the retailer host processor. The host processor next validates the bar code 1202 and passes the resulting data to the DCNI. Since the account number is valid, an acknowledgment of validity (ACK) is returned 1203 via the host processor to the checkout scanner, along with the biller name and account number. The amount to be paid is queried 1204 at the checkout scanner, and the amount entered is passed 1205 to the retailer host processor, which passes 1206 the bar code data and the amount entered to the DCNI, where this transaction data is stored 1207. If the data store is successful, an acknowledgment is sent 1208 via the host processor to the checkout scanner, along with a transaction ID number. The checkout scanner may then print 1209 the biller name, account number, and transaction ID as a transaction receipt. As shown in FIG. 13, in the case of an invalid account number, the checkout scanner first reads the bar code 1301 and passes it to the retailer host processor. The host processor next validates the bar code 1302 and passes the resulting data to the DCNI. Since some aspect of the data passed to the DCNI is invalid, an acknowledgment of invalidity (NAK) is returned 1303 to the host processor with a reason code. The Reject Payment status, passed to the checkout scanner 1304 from the host processor, may or may not contain the DCNI reject reason code for human feedback. Reason codes might include, e.g., invalid scan line (not a valid bill payment "signature" scan line), Biller ID check digit error, invalid Biller ID (old biller that is not serviced anymore), or Biller Customer Account Number check digit error. Payment is consequently rejected at the checkout scanner 1304.

In one embodiment, the Transaction ID that is returned to the retailer back-end host processor, as a positive confirmation that the transaction data has been accepted and successfully stored, is a 15 digit number consisting of: DCNI unit identification (7 digits), last digit of year (1 digit), Julian date (3 digits), and transaction sequence number (4 digits). This information may be printed on the customer receipt as three groups of digits (7, 4, 4) as an ease-of-use issue, should it be necessary for the consumer to dictate his Transaction ID to a customer service representative over the telephone.

Periodically throughout the day (primarily based on time and transaction volume thresholds), the DCNI unit should transmit its stored data to the transaction collection system after it has aged past the "transaction void" window. The "transaction void" window is defined as the time past which the transaction cannot be canceled after it is taken (e.g. 15 minutes to eliminate the possibility of fraud). In one embodiment, the data elements of each transaction transmitted to the host consist of the following: Retailer ID, Biller ID, Biller Account Number, Amount Paid, Sequence Number, Transaction Date/Time Stamp, Status as Active or Void, and Operator ID. When these transactions are transmitted to the transaction collection system, they may be sent in batches whose batch name conforms to the following naming convention: DCNI unit identification (7 digits), last digit of year (1 digit), Julian date (3 digits), and last transaction sequence number in batch (4 digits). Such a numbering convention makes it easier for customer service operations personnel to trace a given Transaction ID.

The design and implementation of the data communication network interface functions could optionally be performed as a real time on-line system or as a batch oriented system to the transaction collection system. If implemented as a real-time system, communication costs to the central site and a redundant "hot cutover" central site hardware configuration is very expensive, by comparison, to eliminate all single point equipment failures in an overall system operation. A central site batch oriented "hot backup" system eliminates the real-time aspect of transaction processing that exponentially escalates costs. Central site redundant hardware still has to be available, but much less of it is required to achieve the same level of system operation reliability.

In systems that are explicitly designed for real-time operation (e.g. credit card verification), "hot cutover" systems contain elements that have to be designed, a priori, into the combination of system and application software to anticipate and to detect the many types of potential system, application or equipment failures. When detected, transaction processing is immediately and automatically transferred to an operational system "in waiting". In the ensuing recovery mode precipitated by this equipment switch over, transactions, in transit at the time of the first system failure, are either pushed through to completion (if past a defined system bottleneck check point) or are pulled back. If a transaction is pulled back, all database record modifications are restored and then the transaction is reprocessed from ground zero.

"Hot backup" designed systems have fewer constraints. Spare equipment is powered up and ready to be switched into operational mode. While time is important, it is not as critical in this situation. In one embodiment, the DCNI unit resubmits transaction batches, not explicitly acknowledged as processed, at a later time (ranging from minutes to hours). Subsequently, if duplicate transactions are encountered on resubmission, they are not processed but are acknowledged as such to the DCNI unit. Much less premeditated contingency system software is required in this environment for robust system operation.

Transaction Collection System

While the data collection network interface may be a single unit, the central site transaction collection system may consist of multiple central processor server units acting in concert to perform a collective set of functions and processes. This design approach permits scaleable processing and avoids the possibility of single point failures that might curtail or impact the production processing of incoming transaction batches.

Figure 14:
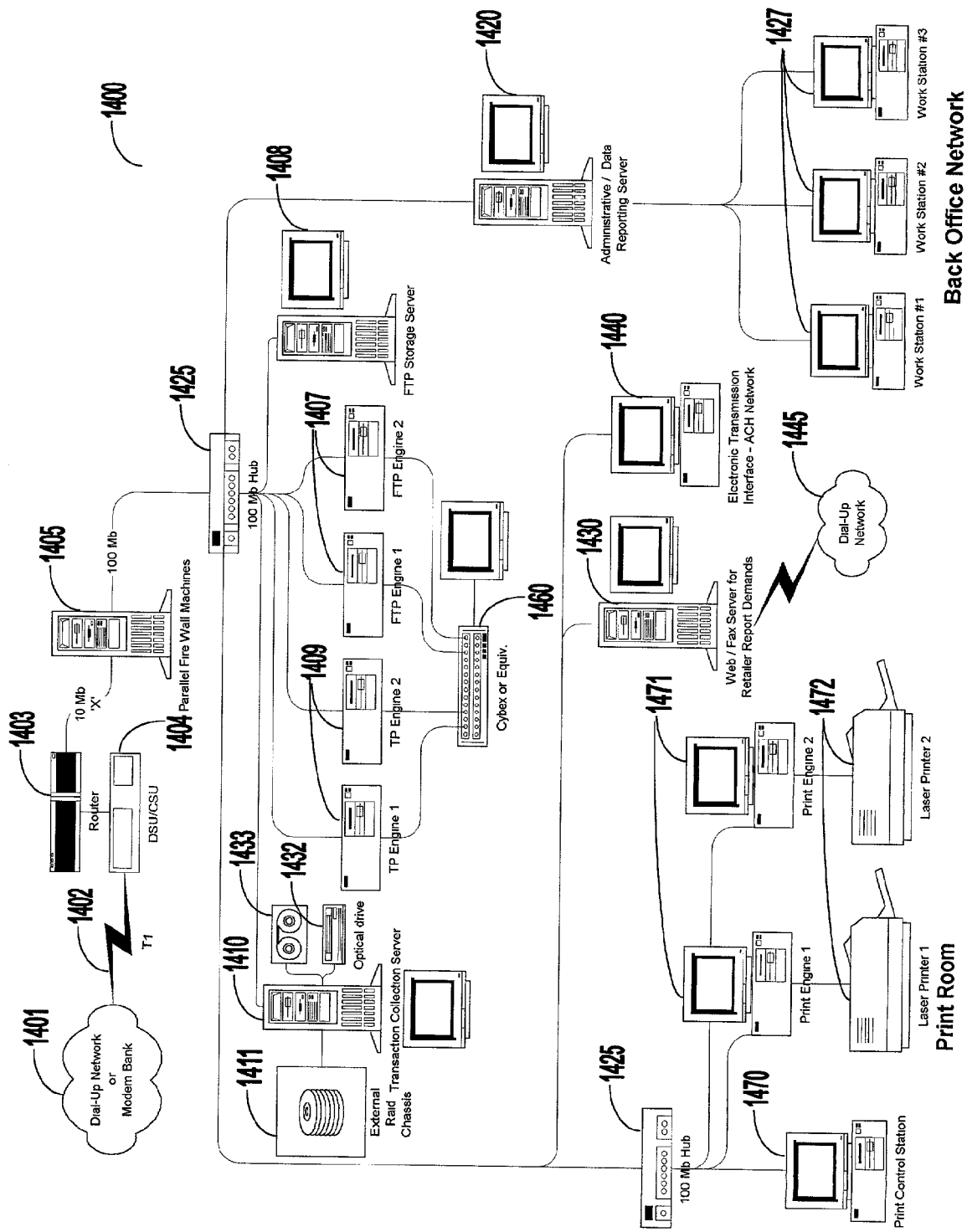
FIG. 14 is a system view diagram of a transaction collection system in one embodiment of the present invention.

FIG. 14 illustrates one possible configuration for the transaction collection system 1400. In the embodiment shown, incoming encrypted data files from the field data collection network interface units would come through a dial-up network or modem bank 1401 over a T1 or similar connection 1402 into an entry router 1403 outside the central site firewall, via a channel service unit/data service unit 1404 (CSU/DSU) or other similar device for providing isolation between the network and the on-premises equipment. Parallel firewall machines 1405, one operating in "hot back up" mode, filter the inbound data traffic from validated and secure data sources. In addition to their primary security role, one of the ancillary functions of the firewalls 1405 is to load balance the data traffic across all available file transfer protocol (FTP) engines 1407. A plurality of FTP engines 1407 are shown in the diagram as being in a scaleable multi-server configuration, coupled via one or more integration hubs (e.g. 100 MB or 1 GB Ethernet hubs) 1425. The FTP engines 1407 provide the raw computing power to transfer data packets from the firewalls 1405, to coalesce the data packets into data files and to write them to the FTP storage server 1408, which may comprise RAID (redundant array of inexpensive disk) storage or similar mass storage.

In the FTP storage machine 1408, a monitor process scans for completed inbound files to process. Upon finding such a file, the file decryption keys are fetched from the central transaction collection server 1410 and the file name is packaged in a message packet that is sent to one of a plurality of transaction processor (TP) engines 1409 in a scaleable multi-server configuration, coupled via one or more integration hubs 1425. It is noted that the transaction processor engines 1409 and FTP engines 1407 may optionally be provided with a console switching unit 1460 for sharing a single console (e.g. monitor, mouse, keyboard) across the plurality of engines 1407, 1409. A transaction processor engine 1409 (TPE), upon receiving this message packet, then has sufficient information available to locate, to decompress and to decrypt the inbound data file into its component data record types. The various received data record types are stored in a database (e.g. Structured Query Language, or SQL) on the transaction collection server 1410. The transaction collection server 1410 database is configured across several partitioned sets of physical hardware 1411 set up for RAID storage operation. The primary purpose for spreading the databases over several pieces of physical and logical hardware and/or software is to avoid having single points of data congestion and equipment failure. The transaction collection server 1410 database is the destination for all the data collected at all the retail processing locations. On a scheduled production basis, the data is aggregated and sorted, according to the biller identification associated with each transaction customer account number. ACH transaction files are prepared and formatted by biller identification, which then maps into biller-designated destination ABA bank routing and bank account numbers.

The administrative/data reporting server 1420 provides access to a copy of the production data for back office operations and monitoring by one or more work stations 1427, without burdening the front end collection system. In the embodiment shown, the "glue" that holds the whole network together is one or more 100 MB or 1 GB Ethernet hubs 1425. This technology provides the foundation cornerstone by which various elements of the network communicate with each other and access each other's mass storage as local devices. The web/fax server 1430 provides on-demand reports to retailers through a web server application. It also provides periodic reports to retailers that can be faxed out through the normal public telephone network 1445. The electronic transmission interface (ETI) machine 1440 prepares the data that has been accumulated and processed by the transaction collection server 1410 for transmission to the Federal Reserve ACH Network. It formats the data into the correct ACH CIE (customer initiated entry) format and transmits this data file to the appropriate destination bank interface. An optical drive 1432, tape storage unit 1433, or other such storage means may be provided for creating removable backups, which may be stored off-site.

In the CIE Entry Detail Record format, the following exemplary fields are populated with bill payment information: AMOUNT (Field 6) is populated with the Customer Payment; INDIVIDUAL NAME (Field 7) is populated with the Transaction Sequence Number (which contains the Julian date of payment); INDIVIDUAL IDENTIFICATION NUMBER (Field 8) is populated with the Biller Customer Account Number; and DISCRETIONARY DATA (Field 9) is populated with the Payment Complete Time encoded as a two digit time field ranging from 00 to 95. This number may be divided by 4 to calculate military hours (decimal) to the nearest quarter hour. For example, the number 26 divided by 4 would yield 6.5 (0630 or 6:30 AM). The remaining fields in the CIE Record format are populated with mandatory banking information data, such as biller ABA and account number.

A print control station 1470 is coupled to one or more print engines 1471 for handling printer transmissions to one or more laser printers 1472 for a variety of report and other printing functions.

Figure 15:
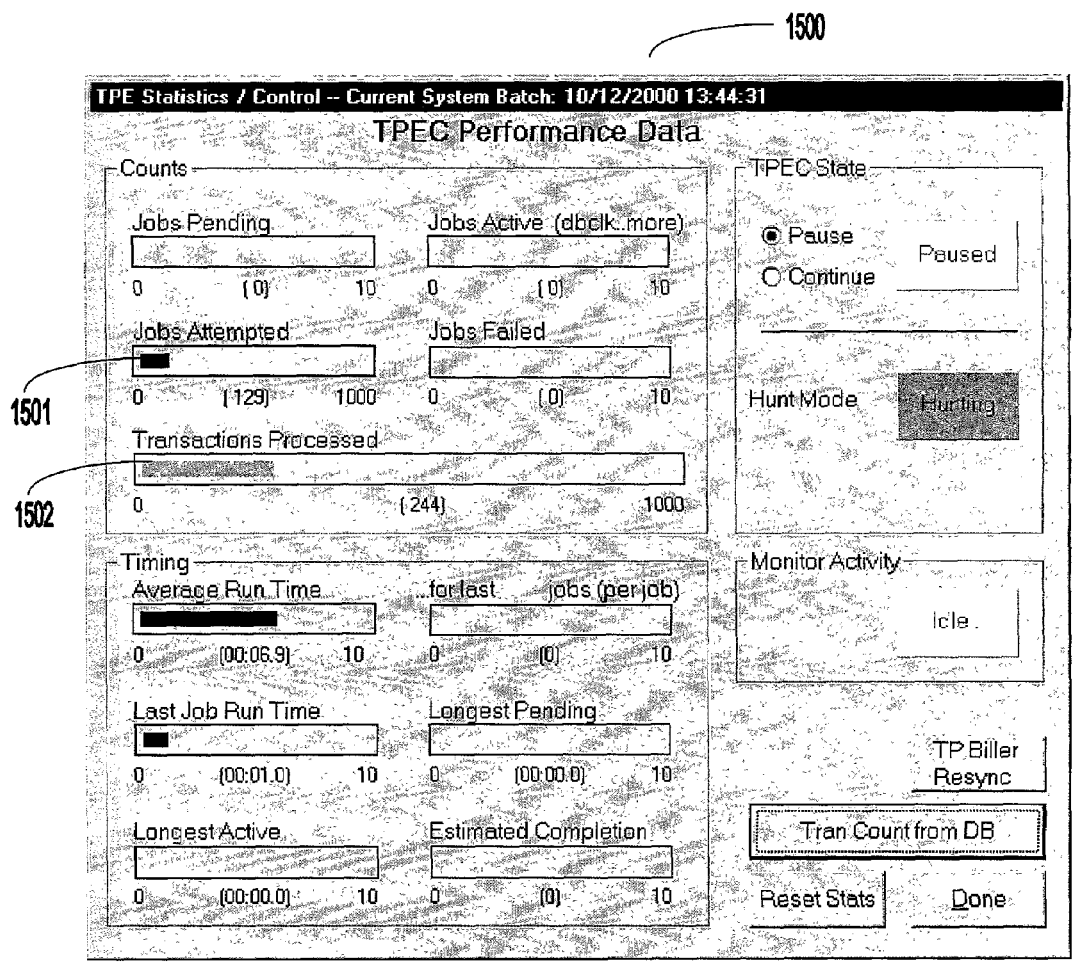
FIG. 15 is an exemplary transaction processor executive controller (TPEC) display screen, in one embodiment of the invention.

FIG. 15 illustrates an exemplary transaction processor executive controller (TPEC) display screen 1500, in one embodiment of the invention. The TPEC monitor program resides in the FTP storage server 1408 and is responsible for detecting complete inbound data files from the field retailer based data communication network interface units. When an inbound data file is detected, TPEC fetches the file decryption key from a master database and then dispatches it and the data file name to one of the transaction processor engine (TPE) 1409 program threads. The TPE 1409 decompresses and decrypts the inbound data file and stores the component plain text data records in the SQL database that resides within the transaction collection server 1410 on RAID storage 1411. As shown, display screen 1500 may include features such as jobs attempted 1501 (i.e. batches received) and transactions processed 1502 (i.e. individual data records processed from the batches received). This display 1500 shows the current Transaction Process Engine(s) batch job statistics for the system batch dated Oct. 12, 2000 at 13:44:31. As shown, TPEC is in PAUSEd State—it is not currently dispatching any detected inbound data files to the TPE engines 1409. For this batch, 129 inbound data files were processed that resulted in 244 data records, stored in the SQL database.

Figure 16:
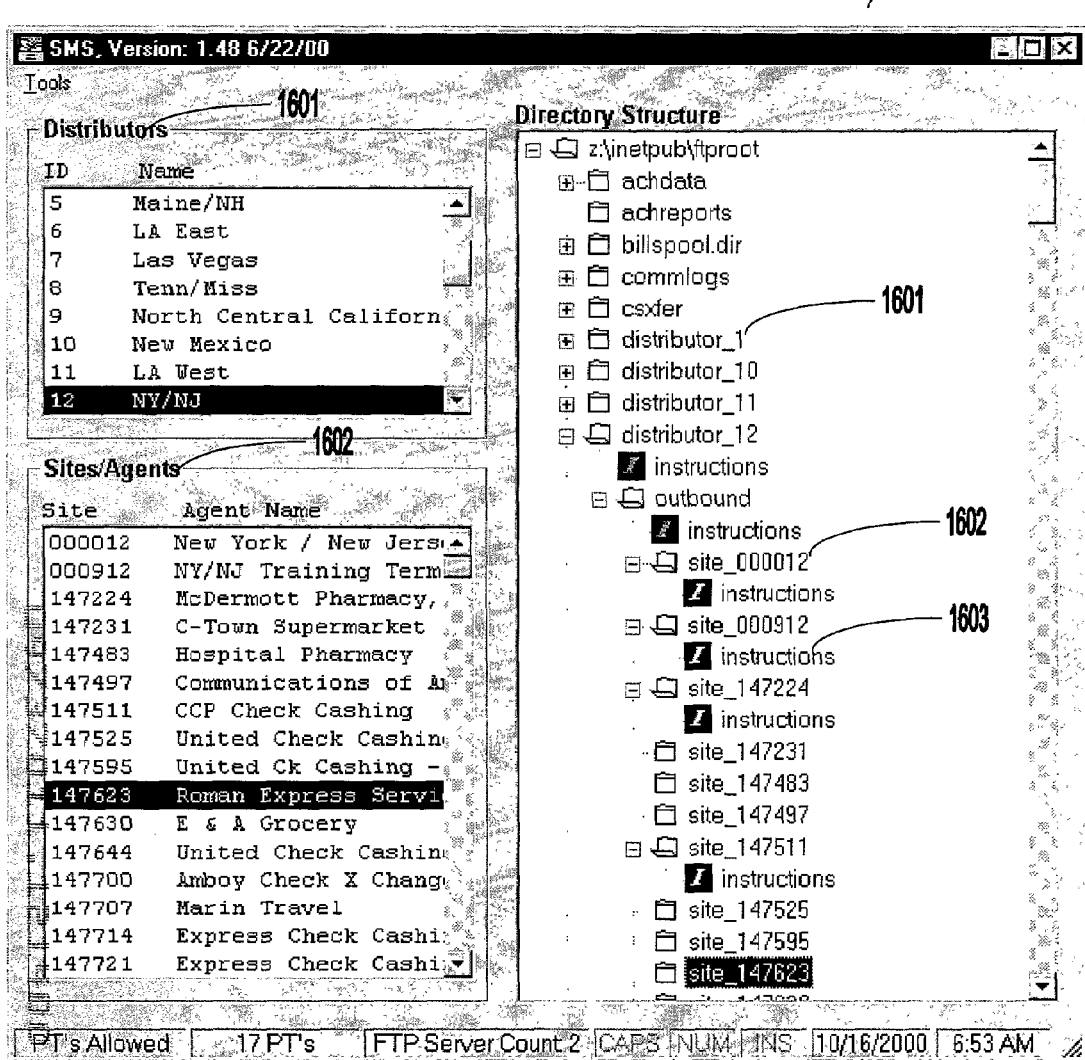
FIG. 16 is an exemplary system monitor station (SMS) display screen, in one embodiment of the invention.

FIG. 16 illustrates an exemplary system monitor station (SMS) display screen 1600, in one embodiment of the invention. This display 1600 shows that individual retailers may be configured in a directory tree-like structure, with each of a plurality of distributors 1601 being a parent to one or more retailer bill pay sites 1602. The directory framework of retailers 1602 may conform to any convenient form of administrative structure, e.g. a distributor model, based on a hierarchy of people, or a physical model, based on territories with defined boundaries (states, counties, or towns). Also illustrated in this display is the placement of INSTRUCTION files 1603 that can reside at any level within an arbitrary configuration structure. An INSTRUCTION file 1603 contains operational directives to be applied to retailer terminals at or below the level of placement in the directory structure (i.e. transaction pricing, unit transmission schedule, revised configuration parameters).

Figure 17:
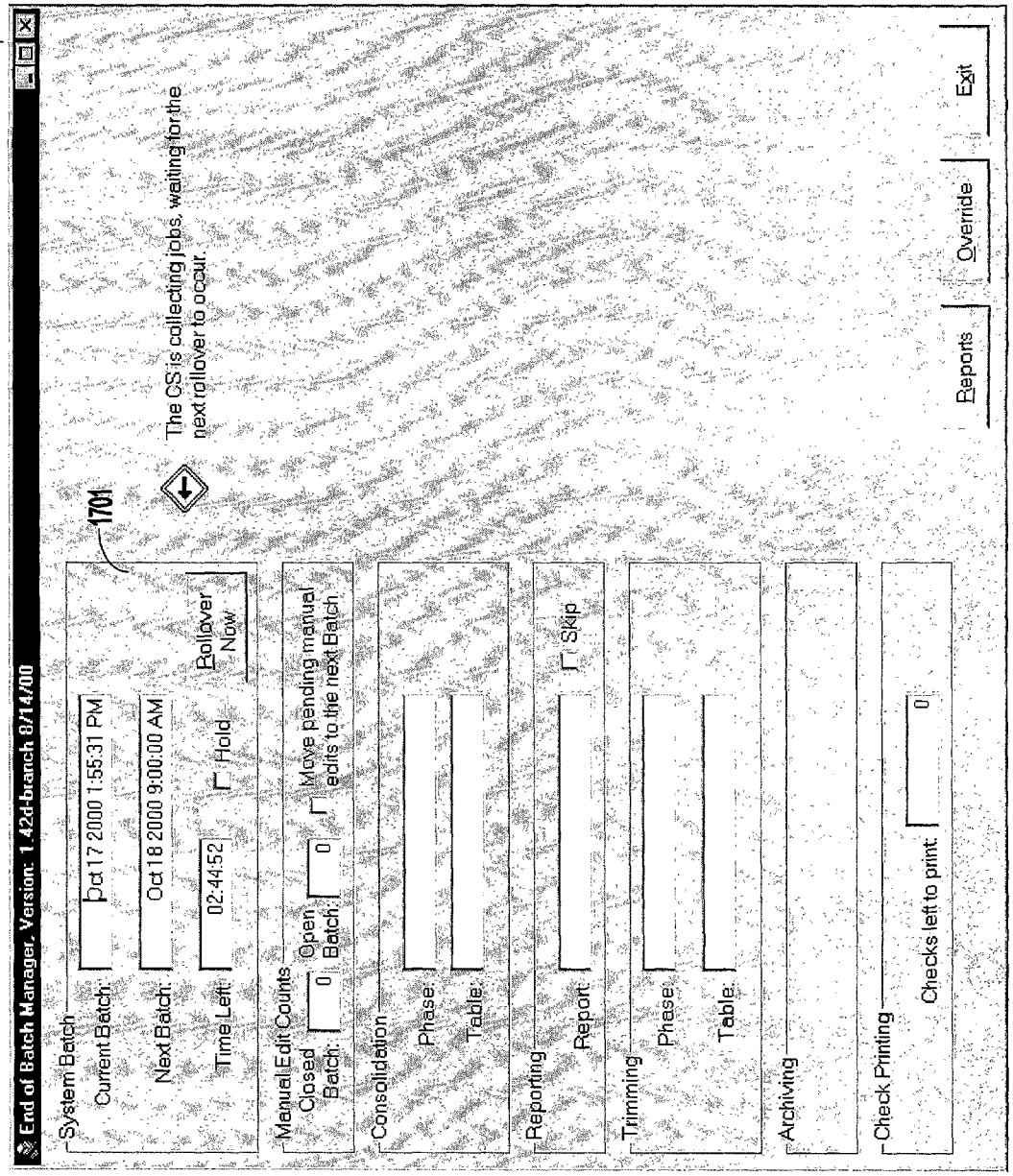
FIG. 17 is an exemplary end of batch monitor (EBM) display screen, in one embodiment of the invention.

FIG. 17 illustrates an exemplary end of batch monitor (EBM) display screen 1700, in one embodiment of the invention. When the current system batch is closed out, this display 1700 shows the status of the various data processing phases (e.g. system batch 1701) that take place when the collection of received transaction data batches from the retail data communication network interface units are consolidated and sorted by biller for electronic transmission. EBM may be a Visual Basic program that orchestrates the series of Structured Query Language (SQL) scripts and ancillary programs to perform transaction consolidation, general system batch reporting, database trimming and data archiving.

Figure 18:
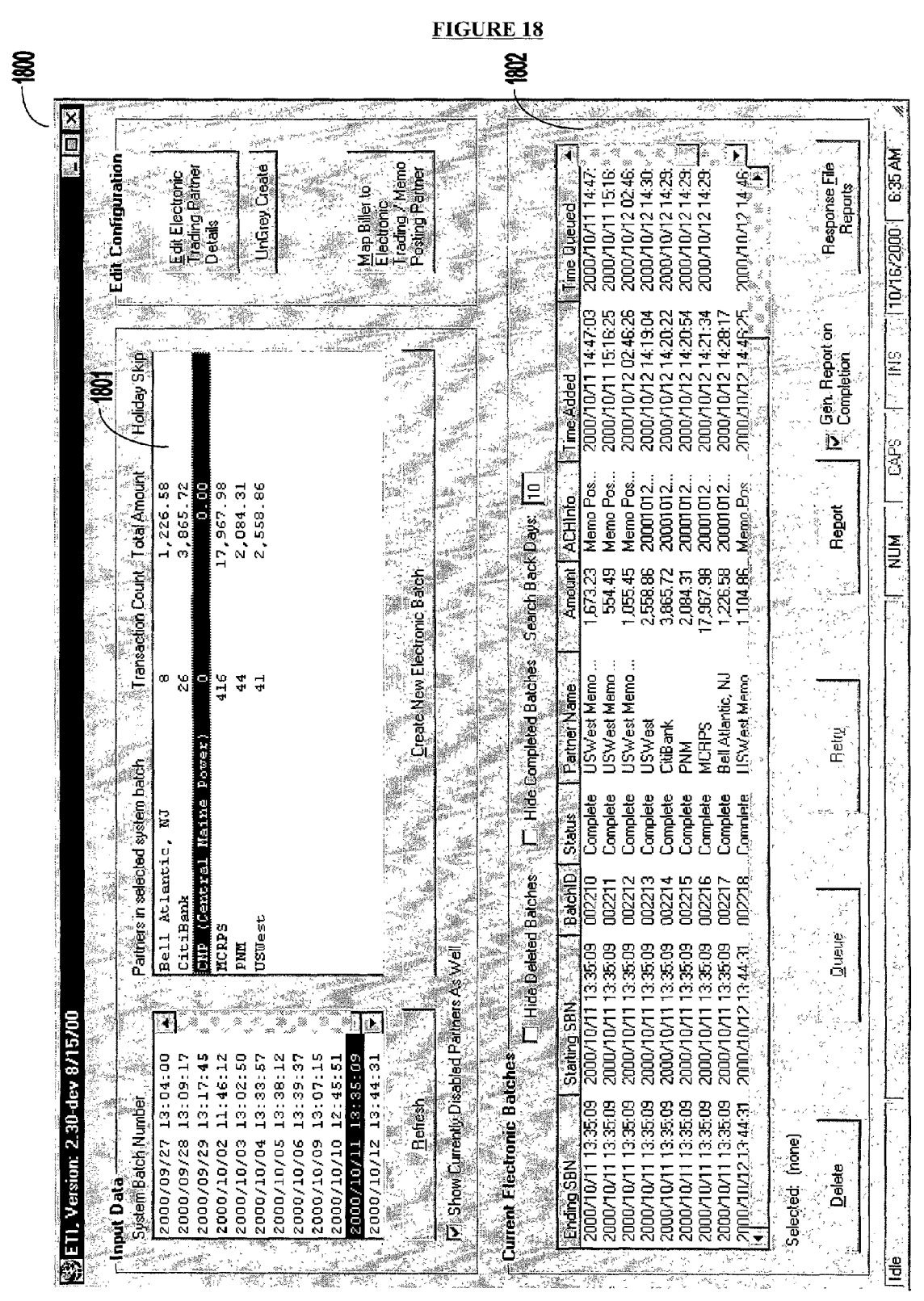

FIG. 18 illustrates an exemplary electronic transmission interface (ETI) display screen 1800, in one embodiment of the invention. This display 1800 includes a summary 1801 of the dollar amounts sent to each of the electronically connected remittance partners. The batch status window 1802 shows the current status of the transmission batches (QUEUED, ACTIVE, DELETED, or COMPLETED). An additional column (not shown) may be included to show the confirmed time of transmission completion.

FIG. 19 illustrates an exemplary ETI transaction detail display screen 1900, in one embodiment of the invention. For a specific partner (in the example shown, MasterCard RPS), this display shows the details for each remitted transaction—biller name 1901, originating source transaction detail for direct traceability 1902, customer account number 1903 and amount paid 1904. From an electronic perspective, the biller is only interested in the payment amounts to be applied to various customer account numbers.

FIG. 20 illustrates an exemplary ETI map biller-to-partner display screen 2000, in one embodiment of the invention. For each biller defined in the system, there is a one-to-one mapping of electronic destinations. While ninety-five percent or more billers may have their remittances delivered via the Federal Reserve ACH network, the remainder of the remittances may be delivered by a combination of directly connected links and secondary consolidator links. Display screen 2000 shows, for each biller, a Biller ID 2001 and Biller Name 2002 mapped to a particular electronic destination 2003. Not explicitly demonstrated by this display is the implicit dynamic mapping of internal Biller IDs 2001 to external Merchant IDs (depending on the electronic link utilized) that has to take place for this system to interoperate successfully with a variety of external electronic networks. Different electronic links may also have different data formats, as those skilled in the art will appreciate.

Figure 21:
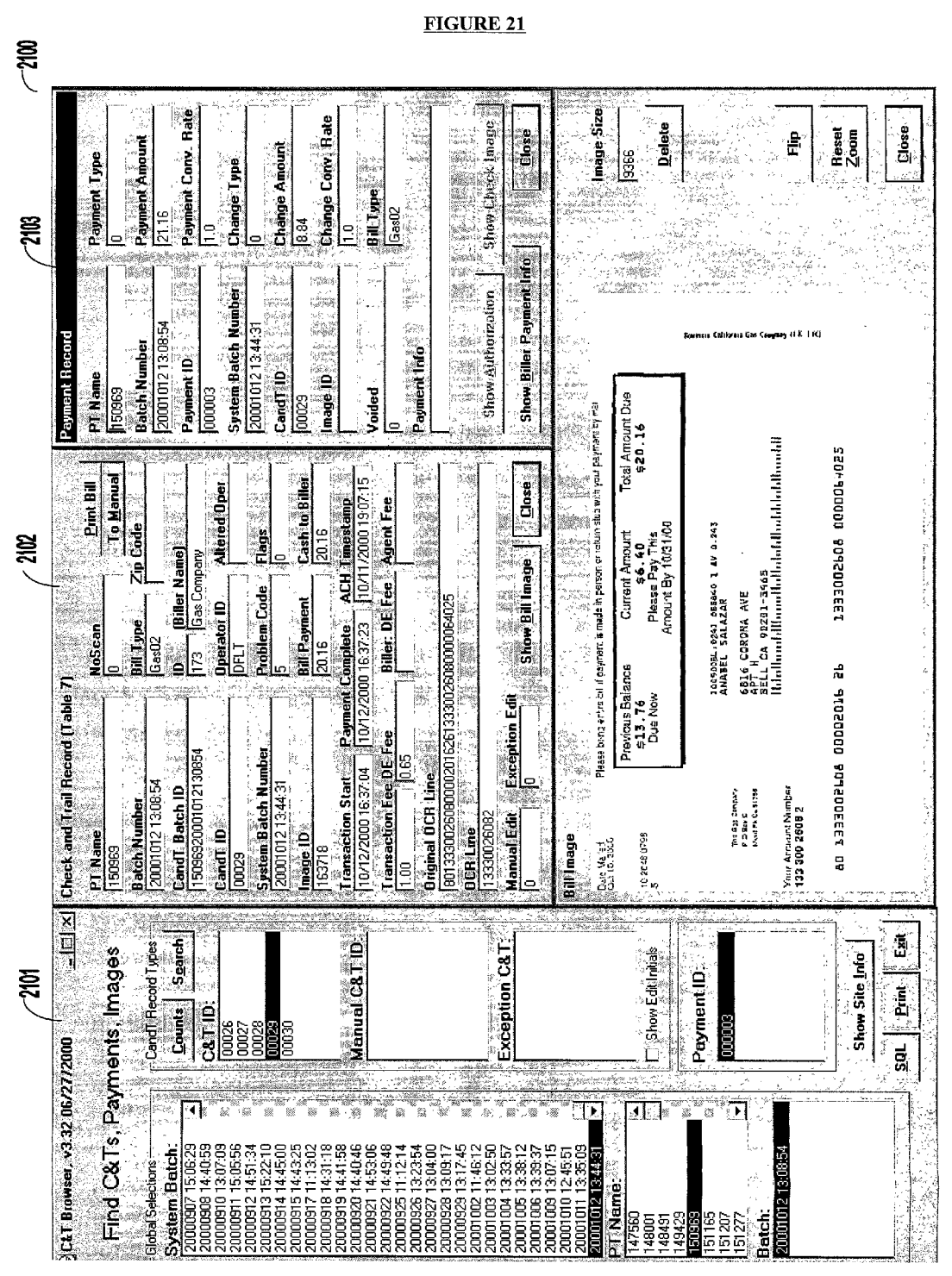

FIG. 21 illustrates an exemplary transaction browser display screen 2100, in one embodiment of the invention. For every transaction processed through the collection system, the transaction browser program accesses and displays all the relevant information pertaining to that transaction, either locally or through a secure Web Server Application access to remote billers. Such information may include, e.g., a selection entry portion 2101, check and trail record 2102, and payment record 2103. (It should be noted that the bill image would typically not be transmitted to the transaction collection system, and that it is shown in this figure for illustrative purposes only.) The system derives the biller account number from the proposed standard format of biller imprinted bar codes, as described herein.

In summary, the primary function of the central site transaction collection system 1400 is to collect transaction data from the retail network, sort and aggregate the data by biller, and to remit the customer payment data and the money to the biller by the Federal Reserve ACH Network. In the same way that customer data is collected, processed and credited to individual billers, the ACH Network is used to electronically debit the retailers for the payments that they have collected from their customers. The transaction fee, paid by the customer, may be shared by the retailer and the transaction processor.

Central Biller Registry System

The current state of the bill payment industry is very fragmented, and many billers currently print their own customer invoices to suit the needs of their own remittance processing systems. There is no universal invoice printing standard to which everyone adheres because there is no economic motivation to do so. Several primary items are required for a bar coded customer bill payment system to succeed: (1) an industry standard that is relatively simple to implement with little or no marginal cost; and (2) a sufficiently large network of retail establishments, induced by the economic incentives of taking bill payments with little or no marginal cost; and (3) a method of delivering totally error-free, electronically remitted customer payment data and funds to billers at no charge.

From a business point of view, there are several organizations that, once persuaded, might provide the required motivation momentum in each of these areas. With this assumption in hand, a central registry system would be required to collect information and to assign the bar code biller identification numbers, in the same manner that Network Solutions assigns domestic Internet addresses for the World Wide Web or the Uniform Code Council assigns UPC codes for the retail industry.

In one embodiment, assigned biller bar code identification numbers may be 7 digits in length. The first 6 digits identify the biller (in a maximum population of 1 million) with the $7^{th}$ digit being the check digit. For every biller bar code identification assigned, the following information might be required for central collection: (1) Biller Name, Address, Phone Number, Fax Number; (2) Biller Administrative Contact Name, Phone Number, E-Mail Address; (3) Biller Remittance Contact Name, Phone Number, E-Mail Address; (4); Electronic Connection Type (ACH or Direct); (5) Bank Name, Address, Remit Account Information, Type; (6) Bank Contact Name, Phone Number, E-Mail Address; (7) Account Number Information—detailed account format specifications. Having collected the foregoing information, a biller bar code identification number would be assigned and a set of bar code print specifications sent to the biller contact. It would then be the responsibility of the biller to print and to remit a set of test bill remittance stubs for conformance testing and validation. Conformance testing on the set of sample bill remittance stubs would ensure that the bar code image quality and physical bar code dimensions satisfied the lowest common denominator bar code scanners at retail. Validation testing would ensure that information, supplied by the biller, regarding the printed bar coded customer account number conformed to published account number validation specifications.

Payment Time Stamp via Federal Reserve ACH Network

The INDIVIDUAL NAME field (Field 7) in the ACH CIE Batch Detail Record contains the customer payment transaction number, which is composed of the following 4 data fields: DCNI unit identification (7 digits), last digit of year (1 digit), Julian Date (3 digits), and the transaction sequence number (4 digits). While the DCNI unit number identifies the retailer where the customer payment was taken, the next four digits specify the year and the Julian date of payment submission and completion. The DISCRETIONARY DATA (Field 9) in the ACH CIE Batch Detail Record may be populated with the Payment Complete Time encoded as a two digit time field ranging from 00 to 95. As stated above, this number may be divided by 4 to calculate military hours (decimal) to the nearest quarter hour. For example, the number 26 divided by 4 would yield 6.5 (0630 or 6:30 AM). Time synchronization may be acquired from universal time standards available through the Internet or national dial-up time services (U.S. Naval Observatory, Wash., DC or the National Institute of Standards and Technology, Boulder, Colo.).

Whether or not sanctioned by a governmental agency, such as the U.S. Post Office, this time stamp could be recognized in much the same way that the U.S. Post Office postmark on letters is used to prove on-time submission. The customer would have printed proof of payment date and time, by virtue of his store receipt, that a biller could not artificially manipulate for purposes of assessing penalty payments. The biller would also have electronic access to this field as well. Currently, the biller has no automated means by which to read the U.S. Post Office postmark for proof of on-time bill payment submission (nor is there any incentive to do so). Bill payment "due date" as specified in the small print of every credit contract can have a variety of individual definitions, none of which is directly visible to or traceable later by the customer. A universal bill payment time stamp would eliminate all the variability of these "due date" definitions if the biller recognized this time stamp as the creditor date of receipt as specified in the Federal Reserve Regulation Z Section 226.10.

The advantage of this date stamping mechanism to the customer is that it would give him marginally more time to remit his bill payment on time to the biller. In the extreme, the customer could pay his bill payment at a late-hours store at one minute to midnight on the due date. The customer would no longer have to worry about remittance delivery times. The advantage of this date stamping mechanism to the biller is that extremely late payments may be electronically credited to the biller no later than 36 hours after customer payment. In the majority of cases in which the biller had multiple daily data feeds from his bank, the credit would probably issue in fewer than 24 hours. Electronically delivered and electronically applied, the current level of biller effort in the handling of late payments would be entirely eliminated with this system in place. In the extreme case, billers could safely invoke 48-hour cut-off notices with little or no error of service call recalls.

Electronically remitting data and money through the Federal Reserve ACH Network only works for those billers whose customer account numbers are less than or equal to 22 digits which is the current maximum width of Field 8, INDIVIDUAL IDENTIFICATION NUMBER, using the standard CIE Entry Detail Record format. If a remitted customer account number is longer than 22 characters, then either one of two possible solutions is available: using Field 3, 80 columns of data in the CIE Addenda Record format; or implementing a dedicated data link to the biller with a biller specific data format.

Alternative Electronic Networks to Accommodate Special Billers

For high volume billers preferring to have their data delivered to them faster than the current Federal Reserve ACH Network delivery schedule, direct file transfer links (e.g. FTP) from the ETI machine through the Internet may be made available. File data formats and the particular delivery mechanisms may be tailored to meet any biller requirement, so long as it expedites the flow of customer payment information. In this mode of operation, biller data would be available for processing within minutes after the scheduled transaction collection system production "system roll" completes. The "system roll" sorts and aggregates biller data on a daily production schedule—once every 12 hours. Payment totals for these transaction batches would be delivered via the ACH Network. For a trusted remitter, it is not necessary to directly couple the transaction dollars with the transaction data. The time lag between transaction data and transaction dollars via the Federal Reserve ACH Network should be no more than 24 hours.

Alternate Embodiments

The present invention may use the public Internet and Internet compatible HTTP and UDP protocols for the network interconnections described herein, as well as the Federal Reserve Automated Clearing House (ACH) Network or other networks. Those skilled in the art will recognize that the servers and their various components, as well as any other components described herein may be implemented in software, hardware, or a combination of both, and may be separate components or be integrated into other components described above. Likewise, the processes described herein may be separate or combined and may run on common, shared, or separate machines, and as integrated or separate software modules.

It will be appreciated by those skilled in the art that, although the functional components of the above described embodiments of the system of the present invention are embodied as one or more distributed computer program processes, data structures, dictionaries or other stored data on one or more conventional general purpose computers (e.g. IBM-compatible, Apple Macintosh, and/or RISC microprocessor-based computers), mainframes, minicomputers, conventional telecommunications (e.g. modem, DSL, satellite and/or ISDN communications), memory storage means (e.g. RAM, ROM) and storage devices (e.g. computer-readable memory, disk array, direct access storage) networked together by conventional network hardware and software (e.g. LAN/WAN network backbone systems and/or Internet), other types of computers and network resources may be used without departing from the present invention.

The invention as described herein may be embodied in one or more computers residing on one or more server systems, and input/output access to the invention may comprise appropriate hardware and software (e.g. personal and/or mainframe computers provisioned with Internet wide area network communications hardware and software (e.g. CQI-based, FTP, Netscape Navigator™ or Microsoft Internet Explorer™ HTML Internet browser software, and/or direct real-time TCP/IP interfaces accessing real-time TCP/IP sockets) for permitting human users to send and receive data, or to allow unattended execution of various operations of the invention, in real-time and/or batch-type transactions and/or at user-selectable intervals. Likewise, it is contemplated that the above-described servers consistent with the present invention may be remote Internet-based servers accessible through conventional communications channels (e.g. conventional telecommunications, broadband communications, wireless communications) using conventional browser software (e.g. Netscape Navigator™ or Microsoft Internet Explorer™), and that the present invention should be appropriately adapted to include such communication functionality. Additionally, those skilled in the art will recognize that the various components of the system of the present invention can be remote from one another, and may further comprise appropriate communications hardware/software and/or LAN/WAN hardware and/or software to accomplish the functionality herein described. Alternatively, a system consistent with the present invention may operate completely within a single machine, e.g. a mainframe computer, and not as part of a network.

Moreover, each of the functional components of the present invention may be embodied as one or more distributed computer program processes running on one or more conventional general purpose computers networked together by conventional networking hardware and software. Each of these functional components may be embodied by running distributed computer program processes (e.g., generated using "full-scale" relational database engines such as IBM DB2™, Microsoft SQL Server™, Sybase SQL Server™, or Oracle 8.0™ database managers, and/or a JDBC interface to link to such databases) on networked computer systems (e.g. comprising mainframe and/or symmetrically or massively parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software.

Primary elements of the invention may be server-based and may reside on hardware supporting an operating system such as Microsoft Windows NT/2000™ or UNIX. Clients may include computers with windowed or non-windowed operating systems, e.g., a PC that supports Apple Macintosh™, Microsoft Windows 95/98/NT/ME/2000™, or MS-DOS™, a UNIX Motif workstation platform, a Palm™, Windows CE™-based or other handheld computer, a network- or web-enabled mobile telephone or similar device, or any other computer capable of TCP/IP or other network-based based interaction. The communications media described herein (generally referred to using the generic term "network") may be a wired or wireless network, or a combination thereof.

Alternatively, the aforesaid functional components may be embodied by a plurality of separate computer processes (e.g. generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as is necessary to permit these functional components to achieve the stated functionalities. In this alternative configuration, since such personal computers typically are unable to run full-scale relational database engines of the types presented above, a non-relational flat file "table" may be included in at least one of the networked personal computers to represent at least portions of data stored by a system consistent with the present invention. These personal computers may run, e.g., Unix, Microsoft Windows NT/2000™ or Windows 95/98/ME™ operating system. The aforesaid functional components of a system consistent with the present invention may also comprise a combination of the above two configurations (e.g. by computer program processes running on a combination of personal computers, RISC systems, mainframes, symmetric or parallel computer systems, and/or other appropriate hardware and software, networked together via appropriate wide- and local-area network hardware and software).

As those in the art will recognize, possible embodiments of the invention may include one- or two-way data encryption and/or digital certification for data being input and output, to provide security to data during transfer. Further embodiments may comprise security means in the including one or more of the following: password or PIN number protection, use of a semiconductor, magnetic or other physical key device, biometric methods (including fingerprint, nailbed, palm, iris, or retina scanning, handwriting analysis, handprint recognition, voice recognition, or facial imaging), or other security measures known in the art. Such security measures may be implemented in one or more processes of the invention.

Source code may be written in an object-oriented or non-object-oriented programming language using relational or flat-file databases and may include the use of other programming languages, e.g., C++, Java, HTML, Perl, UNIX shell scripting, assembly language, Fortran, Pascal, Visual Basic, and QuickBasic. It is noted that the screen displays illustrated herein at FIGS. 15–21 are provided by way of example only, and are not to be construed as limiting the invention or any component thereof to the exemplary embodiments illustrated therein.

Furthermore, it is contemplated that the system and method described herein may be implemented as part of a business method, wherein payment is received from users, which might include customers, retailers, and/or billers employing the invention. Such users may pay for the use of the invention based on the number of files, messages, bills, or other units of data sent or received or processed, based on bandwidth used, on a periodic (weekly, monthly, yearly) or per-use basis, or in a number of other ways consistent with the invention, as will be appreciated by those skilled in the art.

Those skilled in the art will recognize that the present invention may be implemented in hardware, software, or a combination of hardware and software. Finally, it should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

What is claimed is:

1. A bill payment system comprising:
an invoice-generating device corresponding to a biller, said invoice-generating device generating at least one invoice for at least one customer of said biller, said invoice comprising a unique bar code, said bar code comprising data identifying at least said customer and said biller, wherein said bar code alone, without additional information, embodies an algorithmic signature identifying said bar code as being proprietary to said bill payment system; and
a scanning apparatus in communication with said bill payment system, said scanning apparatus configured to permit a cashier to scan said bar code, said scanning apparatus further being capable, based on the identifying data of said bar code and payment data corresponding to the entry into said bill payment system of a payment made to said cashier by said customer in person, of effecting or initiating transmission or transfer of funds to an account corresponding to said biller in a predetermined amount and concomitantly effecting or initiating transmission or transfer of at least a portion of said payment data to a computer of said biller.

2. A system according to claim 1, wherein said funds are transmitted or transferred as an electronic funds transfer.

3. A system according to claim 1, wherein said funds are transmitted or transferred via the Automated Clearing House.

4. A system according to claim 1, wherein said bar code comprises a plurality of validation levels.

5. A system according to claim 1, wherein said payment data comprises the date and time said customer makes said payment or the place said payment is made.

6. A system according to claim 1, wherein said scanning apparatus is integrated into a point-of-sale system.

7. A system according to claim 1, wherein said scanning apparatus is in a location selected from the group consisting of: grocery store, convenience store, supermarket, chain store, post office, drug store, government office, location where goods are sold, location where services are sold, and retail store.

8. A system according to claim 1, wherein said bar code is in a location selected from the group consisting of: on the front of said invoice, on the reverse of said invoice, detachably printed on said invoice, and on a separate piece of paper from said invoice.

9. A system according to claim 1, wherein said data identifying said biller is assigned by a central registry authority.

10. A system according to claim 1, wherein said scanning apparatus is configured to print a receipt evidencing said payment.

11. A bill payment method comprising:
generating an invoice for at least one customer, said invoice comprising a unique bar code, said bar code comprising data identifying at least said customer and said biller, wherein said bar code alone, without additional information, embodies an algorithmic signature identifying said bar code as being proprietary to said bill payment method;
receiving, via a scanning device operated by a third party who scanned said bar code using said device, the identifying data of said bar code and payment data corresponding to a payment made by said customer in person to said third party; and
effecting or initiating transmission or transfer of funds to an account corresponding to said biller in a predetermined amount based on the identifying data of said bar code and said payment data and concomitantly effecting or initiating transmission or transfer of at least a portion of said payment data to a computer of said biller.

12. A method according to claim 11, wherein said funds are transmitted or transferred as an electronic funds transfer.

13. A method according to claim 11, wherein said funds are transmitted or transferred via the Automated Clearing House.

14. A method according to claim 11, wherein said bar code comprises a plurality of validation levels.

15. A method according to claim 11, wherein said payment data comprises the date and time said customer makes said payment or the place said payment is made.

16. A method as claimed in claim 15, further comprising using a biller computer comprising accounts receivable software to apply said payment made by said customer against said invoice as of said date and time said customer makes said payment.

17. A method according to claim 11, wherein said scanning is performed by said third party at a point-of-sale system.

18. A method according to claim 11, wherein said scanning is performed by said third party in a location selected from the group consisting of: grocery store, convenience store, supermarket, chain store, post office, drug store, government office, location where goods are sold, location where services are sold, and retail store.

19. A method according to claim 11, wherein said bar code is in a location selected from the group consisting of: on the front of said invoice, on the reverse of said invoice, detachably printed on said invoice, and on a separate piece of paper from said invoice.

20. A method according to claim 11, wherein said data identifying said biller is assigned by a central registry authority.

21. A method according to claim 11, further comprising printing a receipt evidencing said payment.

22. A bill payment network comprising:
at least one invoice-generating device corresponding to at least one of a plurality of billers, said invoice-generating device generating an invoice for at least one customer of at least one said biller, said invoice comprising a unique bar code, said bar code comprising data identifying at least said customer and said biller, wherein said bar code alone, without additional information, embodies an algorithmic signature identifying said bar code as being proprietary to said bill payment network; and
at least one scanning device in communication with said bill payment network, said scanning device corresponding to at least one of a plurality of third parties, said scanning device capable of scanning said bar code and, based on the identifying data of said bar code and payment data corresponding to a payment made by said customer in person to one of said third parties, of effecting or initiating transmission or transfer of funds to an account corresponding to said biller in a predetermined amount and concomitantly effecting or initiating transmission or transfer of at least a portion of said payment data to a computer of said biller.

23. A network according to claim 22, wherein said funds are transferred or transmitted as an electronic funds transfer.

24. A network according to claim 22, wherein said funds are transferred or transmitted via the Automated Clearing House.

25. A network according to claim 22, wherein said bar code comprises a plurality of validation levels.

26. A network according to claim 22, wherein said payment data comprises the date and time said customer makes said payment or the place said payment is made.

27. A network according to claim 22, wherein said scanning device is integrated into a point-of-sale system.

28. A network according to claim 22, wherein said scanning device is in a location selected from the group consisting of: grocery store, convenience store, supermarket, chain store, post office, drug store, government office, location where goods are sold, location where services are sold, and retail store.

29. A network according to claim 22, wherein said bar code is in a location selected from the group consisting of: on the front of said invoice, on the reverse of said invoice, detachably printed on said invoice, and on a separate piece of paper from said invoice.

30. A network according to claim 22, wherein said data identifying said biller is assigned by a central registry authority.

31. A network according to claim 22, wherein said scanning device is configured to print a receipt evidencing said payment.

32. A bill payment method comprising:
receiving an invoice comprising a unique bar code, said bar code comprising data identifying at least a customer and a biller, wherein said bar code alone, without additional information, embodies an algorithmic signature identifying said bar code as being proprietary to said bill payment method;
scanning said bar code by means of a computer coupled to a scanning apparatus, said computer in communication with a computer-implemented payment network;
receiving a payment from said customer in person;
inputting payment data regarding said payment into said computer; and
based on the identifying data of said bar code and said payment data, using said computer for effecting or initiating transmission or transfer of funds to an account corresponding to said biller in a predetermined amount and concomitantly effecting or initiating transmission or transfer of at least a portion of said payment data to a computer of said biller.

33. A method according to claim 32, wherein said funds are transferred or transmitted as an electronic funds transfer.

34. A method according to claim 32, wherein said funds are transferred or transmitted via the Automated Clearing House.

35. A method according to claim 32, wherein said bar code comprises a plurality of validation levels.

36. A method according to claim 32, wherein said payment data comprises the date and time said customer makes said payment or the place said payment is made.

37. A method as claimed in claim 36, further comprising using a biller computer comprising accounts receivable software to apply said payment made by said customer against said invoice as of said date and time said customer makes said payment.

38. A method according to claim 32, wherein said scanning is performed at a point-of-sale system.

39. A method according to claim 32, wherein said scanning is performed in a location selected from the group consisting of: grocery store, convenience store, supermarket, chain store, post office, drug store, government office, location where goods are sold, location where services are sold, and retail store.

40. A method according to claim 32, wherein said bar code is in a location selected from the group consisting of: on the front of said invoice, on the reverse of said invoice, detachably printed on said invoice, and on a separate piece of paper from said invoice.

41. A method according to claim 32, wherein said data identifying said biller is assigned by a central registry authority.

42. A method according to claim 32, further comprising printing a receipt evidencing said payment.

43. A method of providing for payment of bills by customers to billers, comprising:
making available to one or more billers a standard format for representing on a printed document data including biller identification and a biller account identifier corresponding to a customer;
permitting one of said billers to generate a document having data in said standard format printed thereon;
providing at one or more locations of one or more third parties one or more scanning apparatus adapted to read data in said standard format, each said apparatus having stored thereon third-party identification data comprising the identity of the third party to which said scanning apparatus corresponds and/or the location of said scanning apparatus;
receiving, by electronic transmission from one of said scanning apparatus, (i) scanned information from said document comprising said biller identification arid said biller account identifier, (ii) payment information entered by said third party corresponding to a payment made by said customer to said third party, and (iii) said stored third-party identification data; and providing said received information to a computer-implemented payment network to effect or initiate transmission or transfer of funds from an account corresponding to said third party via an intermediate aggregation account to an account of one of said billers identified by said biller identification in an amount identified by said payment information and concomitantly effecting or initiating transmission or transfer of said payment information to a computer of said biller;

wherein the only personal information of the customer used in said transfer or transmission of funds is said biller account identifier.

44. A method as claimed in claim 43, wherein said payment information comprises the date and time said payment is made.

45. A bill payment system comprising:

an invoice-generating device corresponding to a biller, said invoice-generating device generating at least one invoice for at least one customer, said invoice comprising a unique bar code, said bar code comprising at least biller identification data and a biller account identifier corresponding to said customer, wherein said bar code alone, without additional information, embodies an algorithmic signature identifying said bar code as being proprietary to said bill payment system; and a scanning apparatus configured to scan said bar code, said scanning apparatus being capable, based on the identifying data of said bar code and payment data corresponding to the entry into said payment system of a payment made by said customer, of effecting or initiating transmission or transfer of funds to an account corresponding to said biller in a predetermined amount and concomitantly effecting or initiating transmission or transfer of at least a portion of said payment data to a computer of said biller;

wherein the only personal information of the customer used in said transfer or transmission of funds is said biller account identifier.

46. A system according to claim 45, wherein said funds are transmitted or transferred as an electronic funds transfer.

47. A system according to claim 45, wherein said funds are transmitted or transferred via the Automated Clearing House.

48. A system according to claim 45, wherein said bar code comprises a plurality of validation levels.

49. A system according to claim 45, wherein said payment data comprises the date and time said customer makes said payment or the place said payment is made.

50. A system according to claim 45, wherein said scanning apparatus is integrated into a point-of-sale system.

51. A system according to claim 45, wherein said scanning apparatus is in a location selected from the group consisting of: grocery store, convenience store, supermarket, chain store, post office, drug store, government office, location where goods are sold, location where services are sold, and retail store.

52. A system according to claim 45, wherein said bar code is in a location selected from the group consisting of: on the front of said invoice, on the reverse of said invoice, detachably printed on said invoice, and on a separate piece of paper from said invoice.

53. A system according to claim 45, wherein said data identifying said biller is assigned by a central registry authority.

54. A system according to claim 45, wherein said scanning apparatus is configured to print a receipt evidencing said payment.

55. A bill payment method comprising:

generating an invoice for at least one customer, said invoice comprising a unique bar code, said bar code comprising at least biller identification data and a biller account identifier corresponding to said customer, wherein said bar code alone, without additional information, embodies an algorithmic signature identifying said bar code as being proprietary to said bill payment method;

receiving, via a scanning device operated by a third party who scanned said bar code using said device, the identifying data of said bar code and payment data corresponding to a payment made by said customer; and effecting or initiating transmission or transfer of funds to an account corresponding to said biller in a predetermined amount based on the identifying data of said bar code and said payment data and concomitantly effecting or initiating transmission or transfer of at least a portion of said payment data to a computer of said biller;

wherein the only personal information of the customer used in said transfer or transmission of funds is said biller account identifier.

56. A method according to claim 55, wherein said funds are transmitted or transferred as an electronic funds transfer.

57. A method according to claim 55, wherein said funds are transmitted or transferred via the Automated Clearing House.

58. A method according to claim 55, wherein said bar code comprises a plurality of validation levels.

59. A method according to claim 55, wherein said payment data comprises the date and time said customer makes said payment or the place said payment is made.

60. A method according to claim 55, wherein said scanning is performed by said third party at a point-of-sale system.

61. A method according to claim 55, wherein said scanning is performed by said third party in a location selected from the group consisting of: grocery store, convenience store, supermarket, chain store, post office, drug store, government office, location where goods are sold, location where services are sold, and retail store.

62. A method according to claim 55, wherein said bar code is in a location selected from the group consisting of: on the front of said invoice, on the reverse of said invoice, detachably printed on said invoice, and on a separate piece of paper from said invoice.

63. A method according to claim 55, wherein said data identifying said biller is assigned by a central registry authority.

64. A method according to claim 55, further comprising printing a receipt evidencing said payment.

65. A bill payment network comprising:

at least one invoice-generating device corresponding to at least one of a plurality of billers, said invoice-generating device generating an invoice for at least one customer of at least one said biller, said invoice comprising a unique bar code, said bar code comprising at least biller identification data and a biller account identifier corresponding to said customer, wherein said bar code alone, without additional information, embodies an algorithmic signature identifying said bar code as being proprietary to said bill payment network; and at least one scanning device in communication with said bill payment network, said scanning device corresponding to at least one of a plurality of third parties, said scanning device capable of scanning said bar code and, based on the identifying data of said bar code and a payment made by said customer, of effecting or initiating transmission or transfer of funds to an account corresponding to said biller in a predetermined amount and concomitantly effecting or initiating transmission or transfer of data to a computer of said biller;

wherein the only personal information of the customer used in said transfer or transmission of funds is said biller account identifier.

66. A network according to claim 65, wherein said funds are transferred or transmitted as an electronic funds transfer.

67. A network according to claim 65, wherein said funds are transferred or transmitted via the Automated Clearing House.

68. A network according to claim 65, wherein said bar code comprises a plurality of validation levels.

69. A network according to claim 65, wherein said payment data comprises the date and time said customer makes said payment or the place said payment is made.

70. A network according to claim 65, wherein said scanning device is integrated into a point-of-sale system.

71. A network according to claim 65, wherein said scanning device is in a location selected from the group consisting of: grocery store, convenience store, supermarket, chain store, post office, drug store, government office, location where goods are sold, location where services are sold, and retail store.

72. A network according to claim 65, wherein said bar code is in a location selected from the group consisting of: on the front of said invoice, on the reverse of said invoice, detachably printed on said invoice, and on a separate piece of paper from said invoice.

73. A network according to claim 65, wherein said data identifying said biller is assigned by a central registry authority.

74. A network according to claim 65, wherein said scanning device is configured to print a receipt evidencing said payment.

75. A bill payment method comprising:

receiving an invoice from a biller, said invoice comprising a unique bar code, said bar code comprising at least biller identification data and a biller account identifier corresponding to said customer, wherein said bar code alone, without additional information, embodies an algorithmic signature identifying said bar code as being proprietary to said bill payment method;

receiving, via a scanning device operated by a third party who scanned said bar code using said device, the identifying data of said bar code and payment data corresponding to a payment made by said customer; and effecting or initiating transmission or transfer of funds to an account corresponding to said biller in a predetermined amount based on the identifying data of said bar code and said payment data and concomitantly effecting or initiating transmission or transfer of at least a portion of said payment data to a computer of said biller;

wherein the only personal information of the customer used in said transfer or transmission of funds is said biller account identifier.

76. A method according to claim 75, wherein said funds are transferred or transmitted as an electronic funds transfer.

77. A method according to claim 75, wherein said funds are transferred or transmitted via the Automated Clearing House.

78. A method according to claim 75, wherein said bar code comprises a plurality of validation levels.

79. A method according to claim 75, wherein said payment data comprises the date and time said customer makes said payment or the place said payment is made.

80. A method according to claim 75, wherein said scanning is performed at a point-of-sale system.

81. A method according to claim 75, wherein said scanning is performed in a location selected from the group consisting of: grocery store, convenience store, supermarket, chain store, post office, drug store, government office, location where goods are sold, location where services are sold, and retail store.

82. A method according to claim 75, wherein said bar code is in a location selected from the group consisting of: on the front of said invoice, on the reverse of said invoice, detachably printed on said invoice, and on a separate piece of paper from said invoice.

83. A method according to claim 75, wherein said data identifying said biller is assigned by a central registry authority.

84. A method according to claim 75, further comprising printing a receipt evidencing said payment.

85. A method of including additional data in an Automated Clearing House funds transfer, said method comprising the steps of:

in an Automated Clearing House electronic funds transfer, inserting one or more data elements into one or more of a customer name field and a user designated discretionary field corresponding to the formal data format specification for a remitted payment record;

remitting said payment record, including said inserted data elements, to the Automated Clearing House for processing, and effecting said processing of said payment record, thereby producing a processed payment record that includes said inserted data elements; and extracting, from said processed payment record, at a receiving computer system, at least one of said inserted data elements;

wherein said data elements comprise one or more of: a local retail transaction number providing traceback information either as a reference link back to a store transaction log or as a reference link back to an electronic transaction database; and the place and/or date and/or time a payment is made.

86. A method of including additional data in an electronic funds transfer, said method comprising the steps of:

in an electronic funds transfer, inserting one or more data elements into a customer name field corresponding to the formal data format specification for a remitted payment record in a payment network;

remitting said payment record, including said inserted data elements, to said payment network for processing, and effecting said processing of said payment record, thereby producing a processed payment record that includes said inserted data elements; and extracting, from said processed payment record, at a receiving computer system, at least one of said inserted data elements;

wherein said data elements comprise one or more of: a local retail transaction number providing traceback information either as a reference link back to a store transaction log or as a reference link back to an electronic transaction database; and the place and/or date and/or time a payment is made.

* * * * *

UNITED STATES PATENT AND TRADEMARK OFFICE
CERTIFICATE OF CORRECTION

PATENT NO.        : 6,993,507 B2
APPLICATION NO. : 09/737011
DATED             : January 31, 2006
INVENTOR(S)       : Meyer It is certified that error appears in the above-identified patent and that said Letters Patent is hereby corrected as shown below:

On the title page, delete:
(75) Inventors:  John Meyer, Orange, CA (US)

Signed and Sealed this

Twenty-fifth Day of March, 2008

JON W. DUDAS
*Director of the United States Patent and Trademark Office*